(12) United States Patent
Nemoto et al.

(10) Patent No.: US 8,594,092 B2
(45) Date of Patent: Nov. 26, 2013

(54) PACKET RELAY METHOD AND DEVICE

(75) Inventors: Satoshi Nemoto, Kawasaki (JP);
Hiroshi Tomonaga, Kawasaki (JP);
Akihiro Hata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1285 days.

(21) Appl. No.: 11/959,615

(22) Filed: Dec. 19, 2007

(65) Prior Publication Data

US 2008/0151897 A1 Jun. 26, 2008

(30) Foreign Application Priority Data

Dec. 25, 2006 (JP) ................ 2006-348215

(51) Int. Cl.
*H04L 12/28* (2006.01)

(52) U.S. Cl.
USPC .......................... 370/392; 370/394

(58) Field of Classification Search
USPC ............... 370/389, 463, 412, 392, 394, 413
See application file for complete search history.

(56) References Cited

U.S. PATENT DOCUMENTS

| | | | | |
|---|---|---|---|---|
| 6,658,596 | B1 * | 12/2003 | Owen et al. .................... | 714/16 |
| 6,859,824 | B1 * | 2/2005 | Yamamoto et al. ............ | 709/217 |
| 6,999,413 | B2 | 2/2006 | Moriwaki et al. | |
| 7,342,887 | B1 * | 3/2008 | Sindhu et al. .................. | 370/235 |
| 2002/0054602 | A1 | 5/2002 | Takahashi et al. | |
| 2002/0057712 | A1 | 5/2002 | Moriwaki et al. | |
| 2005/0129020 | A1 * | 6/2005 | Doyle et al. .................. | 370/392 |
| 2007/0263631 | A1 * | 11/2007 | Mallory ......................... | 370/394 |

FOREIGN PATENT DOCUMENTS

| | | |
|---|---|---|
| JP | 2002-152267 | 5/2002 |
| JP | 2002-185495 | 6/2002 |
| JP | 2005-286383 | 10/2005 |
| JP | 2006-165952 | 6/2006 |

OTHER PUBLICATIONS

Notification of Reasons for Refusal dated Apr. 5, 2011, from corresponding Japanese Application No. 2006-348215.

* cited by examiner

*Primary Examiner* — Man Phan
*Assistant Examiner* — Mandish Randhawa
(74) *Attorney, Agent, or Firm* — Katten Muchin Rosenman LLP

(57) ABSTRACT

In a packet relay method and device which can reduce a congestion of switching even when segment data are concentrated, segment data dividing portions respectively extract a destination address and a packet length from received packets, divide the packets into predetermined length data based on each packet length, and generates location information indicating locations in the packets respectively for the data. The segment data dividing portions add segment headers in which the location information, the destination address, and an address of its own device as a source address are set are added to each of the data, generate segment data, and provide the segment data to switches within a switch card in parallel.

6 Claims, 25 Drawing Sheets

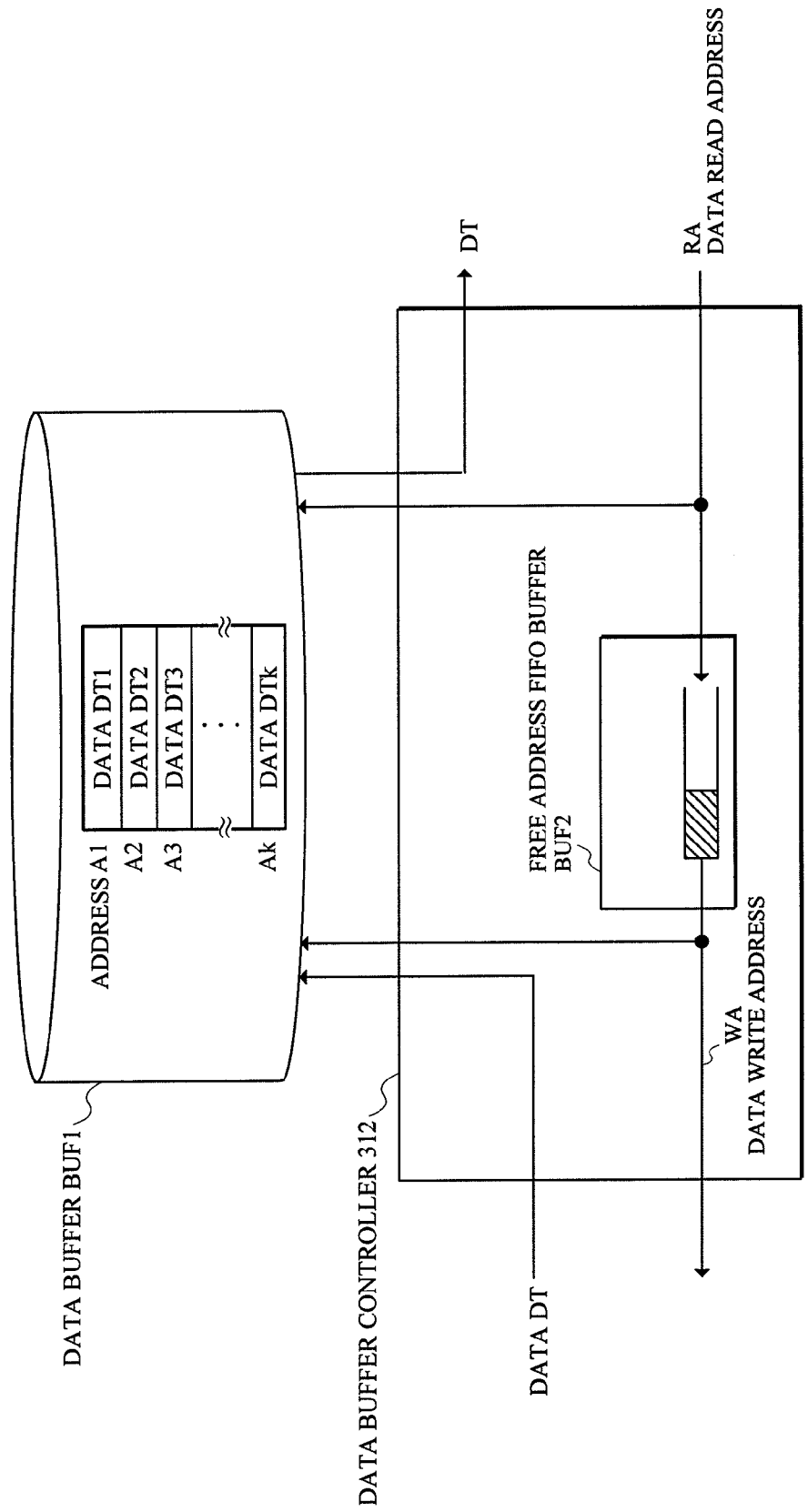

FIG.11A

LINK LIST MANAGEMENT INFORMATION MEMORY MEM2
LINK LIST MANAGEMENT INFORMATION LINFO

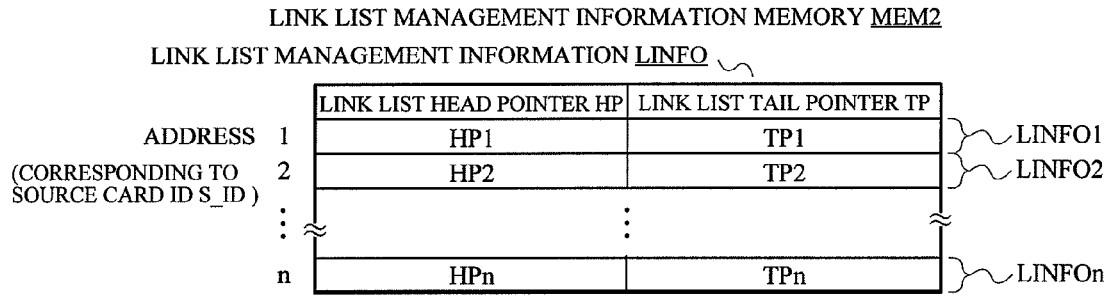

| ADDRESS | LINK LIST HEAD POINTER HP | LINK LIST TAIL POINTER TP | |
|---|---|---|---|
| 1 | HP1 | TP1 | LINFO1 |
| 2 | HP2 | TP2 | LINFO2 |
| ⋮ | ⋮ | ⋮ | |
| n | HPn | TPn | LINFOn |

(CORRESPONDING TO SOURCE CARD ID S_ID)

FIG.11B

LINK LIST MEMORY MEM1

| ADDRESS | SEGMENT HEADER SH | NEXT POINTER NP (NEXT DATA WRITE ADDRESS) |
|---|---|---|
| A1 | SH1 | NP1 |
| A2 | SH2 | NP2 |
| ⋮ | ⋮ | ⋮ |
| Ak | SHk | NPk |

(CORRESPONDING TO DATA WRITE ADDRESS WA)

FIG.11C

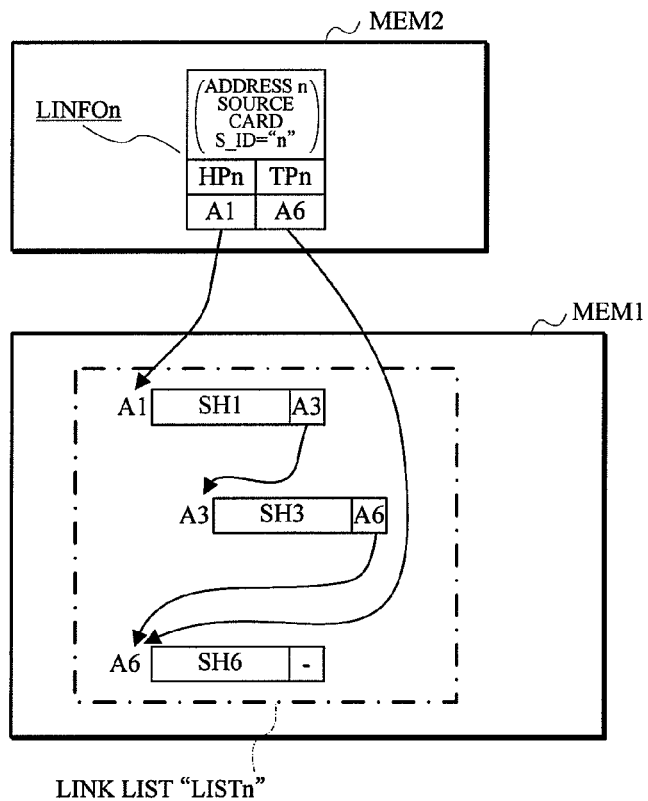

LINK LIST "LISTn"

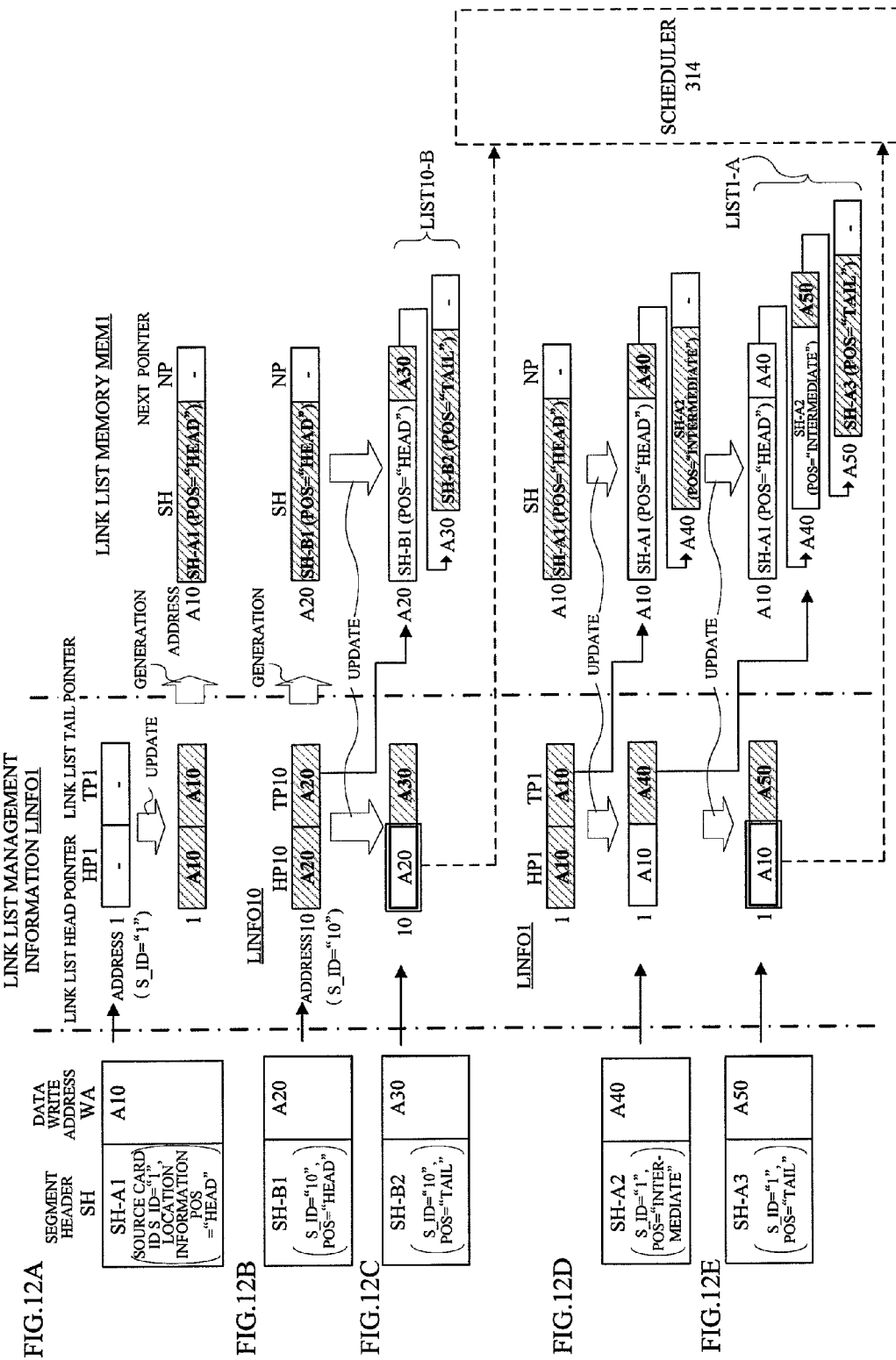

FIG.21A

DATA WRITE ADDRESS/SEGMENT HEADER
STORING BUFFER BUF3

FIG.21B

SORT MANAGEMENT INFORMATION RINFO

PACKET RELAY METHOD AND DEVICE

BACKGROUND OF THE INVENTION

1. Field of the Invention

The present invention relates to a packet relay method and device, and in particular to a packet relay method and device which divide a packet into segment data of a predetermined length to be relayed.

2. Description of the Related Art

A prior art example of a packet relay method and device as mentioned above will now be described referring to FIG. 25.

Prior Art Example: FIG. 25

In input side interface cards 10_1-10_n (hereinafter, occasionally represented by a reference numeral 10) composing a packet relay device 1 shown in FIG. 25, receivers 11_1-11_n respectively receive packets PD from the preceding stage, and segment data dividers 12_1-12_n (hereinafter, occasionally represented by a reference numeral 12) divide the received packets PD into segment data SD of a predetermined length to be sequentially provided to a switch card 20.

The segment data SD includes a destination address of the packet PD in its header. The switch card 20 having received the data performs sorting (hereinafter, referred to as switching) the segment data SD to any of output side interface cards 30_1-30_n (hereinafter, occasionally represented by a reference numeral 30) according to the destination address.

In the output side interface cards 30_1-30_n having received the segment data SD to which the switching is performed, packet assembling portions 31_1-31_n (hereinafter, occasionally represented by a reference numeral 31) respectively assemble the packets PD from the segment data SD, and transmitters 32_1-32_n transmit the packets PD assembled to the subsequent stage.

Thus, by switching the packets per segment data, a priority control of packets (for example, when a packet whose priority is higher than that of the packet antecedently inputted is received, the switching is performed to the segment data of the packet with higher priority before the segment data of the packet with lower priority antecedently inputted) or the like can be performed, thereby guaranteeing a communication quality of the packet.

It is to be noted that as reference examples, the following (1) and (2) can be mentioned:

Reference Example (1)

A packet processing device which enqueues an inputted packet to any of a plurality of queues according to its class (priority), and dequeues the packet from the queue selected by performing scheduling and a bandwidth calculation based on the class, the number of segment data upon dividing the inputted packet per a predetermined length, and the total number of segment data within the queues (see e.g. patent document 1).

Reference Example (2)

A packet relay device which refers a multipath routing table in which a plurality of different path information are set per destination address when a plurality of packets with the same destination address are provided to input side interface cards, thereby selectively sorting the packets to at least two output side interface cards according to the path information (see e.g. patent document 2).

[Patent document 1] Japanese patent application laid-open No. 2005-286383

[Patent document 2] Japanese patent application laid-open No. 2006-165952

With a recent increase of packet communication traffic, the number of segment data transferred within the packet relay device tends to increase.

In this case, the segment data transmitted from the input side interface cards may concentrate in the switch card in the prior art example shown in FIG. 25. Accordingly, there has been a problem that the switching process is congested, which leads to a transmission delay, missing, etc. of the packet.

SUMMARY OF THE INVENTION

It is accordingly an object of the present invention to provide a packet relay method and device which can reduce a congestion of switching even when segment data concentrate.

[1] In order to achieve the above-mentioned object, a packet relay method (or device) according to one aspect of the present invention comprises: a first step of (or first portion) extracting, every time a packet is received, a destination address and a packet length from the packet; a second step of (or second portion) dividing the packet into predetermined length data based on the packet length, and generating location information indicating a location within the packet for each of the data divided; a third step of (or third portion) generating segment data where a segment header in which the location information, the destination address, and an address of a device executing the packet relay method as a source address are set, is added to each of the data divided; and a fourth step of (or fourth portion) providing each of the segment data to a switch card in parallel.

Namely, in the packet relay method (or device) (segment data transmitting side) according to one aspect of the present invention, segment data generated are provided to a switch card in parallel every time a packet is received, so that the switch card can perform switching without an occurrence of congestion or the like with a small throughput.

Also, location information and a source address are set in a segment header of each segment data, so that a segment data receiving side can assemble a packet based on them.

[2] Also, in the above-mentioned [1], the fourth step (or fourth portion) may comprise sequentially circulating and transmitting the segment data to a plurality of physical or logical transmission lines for providing the segment data to the switch card in parallel.

Namely, the segment data are circulated and transmitted to the transmission lines for providing the data to the switch card in parallel, thereby enabling resources within the switch card to be equally used and a switching load to be more reduced.

[3] Also, in the above-mentioned [1], the packet relay method (or device) may further comprise a fifth step of (or fifth portion) assigning a sequence number to the location information per destination address, and the third step (or third portion) may include a step of (or portion) setting the sequence number to the segment header.

Namely, when a difference occurs or the like in a processing time of the segment data due to the difference of the switching load, throughput, or the like of the resources within the switch card, reception order of the segment data on the segment data receiving side may differ from transmission order on the segment data transmitting side.

Therefore, on the segment data transmitting side, a sequence No. is assigned to each location information per source address to be set in the segment header of each segment data.

Thus, on the segment data receiving side, the segment data can be sorted based on the sequence No. and the original packet can be assembled in the correct order.

[4] Also, in order to achieve the above-mentioned object, a packet relay method (or device) according to one aspect of the present invention comprises: a first step of (or first portion) separating segment data into a segment header and one data, every time the segment data where the segment header in which a source address and location information indicating a location within a packet for the one data are set is added to the one data within the packet divided per predetermined length is received from a switch card in parallel; a second step of (or second portion) sequentially storing the one data separated; a third step of (or third portion) generating or updating a link list associating the segment header separated with a storage of the one data separated per source address based on the location information set in the segment header separated; a fourth step of (or fourth portion) sequentially reading the one data from the storage obtained by sequentially referring to the link list; and a fifth step of (or fifth portion) collecting (or combining) the one data read to assemble the packet based on the location information set in the segment header obtained by sequentially referring to the link list.

Namely, on the segment data receiving side, the segment data can be received from a plurality of source addresses in parallel by the switching of the switch card described in e.g. the above-mentioned [1]. Therefore, each segment data is firstly separated into the segment header and the one data, so that the one data separated is once stored.

A link list in which the separated segment header is associated with a storage of the one data separated per source address is generated or updated based on the location information set in the separated segment header.

A location of the one data within a packet is set in the location information. When the location information indicates e.g. the head of the packet, a link list is newly generated, and the link list is updated until the location information indicates the tail of the packet. Thus, the link list per packet is generated per source address.

One data sequentially read from the storage obtained by sequentially referring to the link list prepared as mentioned above is collected based on the location information set in the segment header obtained by referring to each link list to assemble the packet.

Thus, even when the segment data is received in parallel from a plurality of source addresses, the original packet can be correctly assembled per source address.

[5] Also, in the above-mentioned [4], the packet relay method (or device) may further comprise a sixth step of (or sixth portion) scheduling the link list generated or updated at the third step (or third portion); and the fourth and fifth steps (or fourth and fifth portions) may comprise performing the sequential referring from the link list to which the scheduling is performed.

Namely, by scheduling the link list, the generation or update of the link list, and the referring and reading thereof can be controlled asynchronously, thereby enabling a control concerning the link list to be promptly performed.

Also, various scheduling technologies using preparation order of the link list, priority of the source address, or the like can be applied to the scheduling.

[6] Also, in the above-mentioned [4], a sequence number of the segment data may be set in the segment header, and the method (or device) may further comprise: a sixth step of (or sixth portion) sequentially associating and storing the segment header separated at the first step (or first portion) with the storage of the one data separated; and a seventh step of (or seventh portion) sequentially referring to the segment header stored at the sixth step (or sixth portion), reading the segment header referred to and the storage of the one data separated corresponding to the segment header and executing the third step (or third portion) when the source address and the sequence number set in the segment header referred to coincide with any source address and a read sequence number of the segment data to be read for the source address, and updating the read sequence number to a sequence number to be read next.

Namely, as described in the above-mentioned [3], the reception order of the segment data is different from the transmission order of the segment data on the transmitting side in some cases, so that the segment header separated and the storage of the one data separated are associated with each other and once stored.

From the segment headers and the storages of the one data stored, the segment header and the one data coincident with a read sequence No. of the segment data to be read next for any source address are read.

Thus, the segment header and the one data can be sorted in order of the sequence No.

[7] Also, in the above-mentioned [6], the sixth step (or sixth portion) may comprise performing the storing with the source address and the sequence number set in the segment header separated being as a key; and the seventh step (or seventh portion) may comprise performing the reading with the source address and the read sequence number being as a key.

Namely, a key generated based on the source address and the sequence No. indicates a unique value different per segment data, so that an area for storing each segment header and the storage of each of the one data can be easily managed by using the key.

[8] Also, in the above-mentioned [6], the sixth step (or sixth portion) may comprise setting, when associating the segment header separated with the storage of the one data separated to be stored, a flag to "received" corresponding to the sequence number set in the segment header stored in management information in which the read sequence number for each source address is associated with the flag indicating whether or not the segment header having set therein each sequence number is stored; and the seventh step (or seventh portion) may comprise circulating the management information per source address to be referred, determining the coincidence when the flag corresponding to the read sequence number is set to "received", and releasing setting of the flag being referred.

Namely, the reception state of the segment data from each source address is uniformly managed by using a flag indicating whether or not the segment header having set therein each sequence No. is stored, so that whether or not the segment data to be read next has been received can be promptly and easily determined.

According to the present invention, a congestion upon switching the segment data can be reduced, thereby enabling the transmission delay, missing, etc. of the packet to be prevented. Also, the switching can be performed to the segment data in parallel, so that a transmission efficiency of the packet can be improved.

Also, the segment data received are sorted so as to be coincident with the transmission order in the transmission source, and then the packet can be assembled, so that the communication quality of the packet can be guaranteed.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 8 is a block diagram showing an arrangement of a data buffer controller and a data buffer used for a packet relay method and device according to the present invention;

FIGS. 11A-11C are block diagrams showing an arrangement of a link list management information memory and a link list memory user for a packet relay method and device according to the present invention;

FIGS. 12A-12E are diagrams showing an operation example (No. 1) of a link list generating/updating portion used for a packet relay method and device according to the present invention;

FIGS. 21A and 21B are diagrams showing an arrangement of a data write address/segment header storing buffer and sort management information used for an embodiment [2] of a packet relay method and device according to the present invention;

DESCRIPTION OF THE EMBODIMENTS

Figure 1:
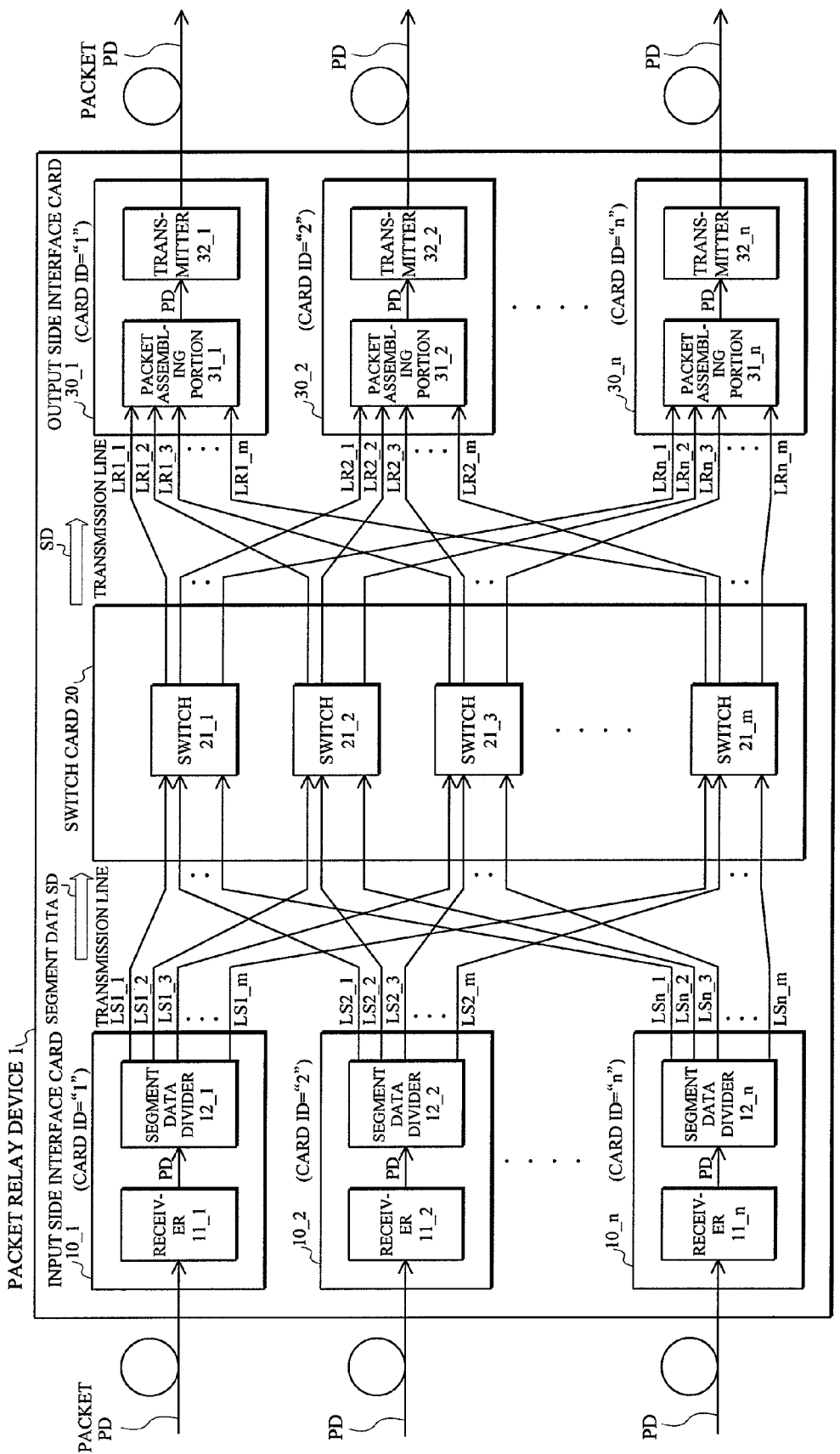
FIG. 1 is a block diagram showing an overall arrangement common to each embodiment of a packet relay method and device according to the present invention.
Figure 2:
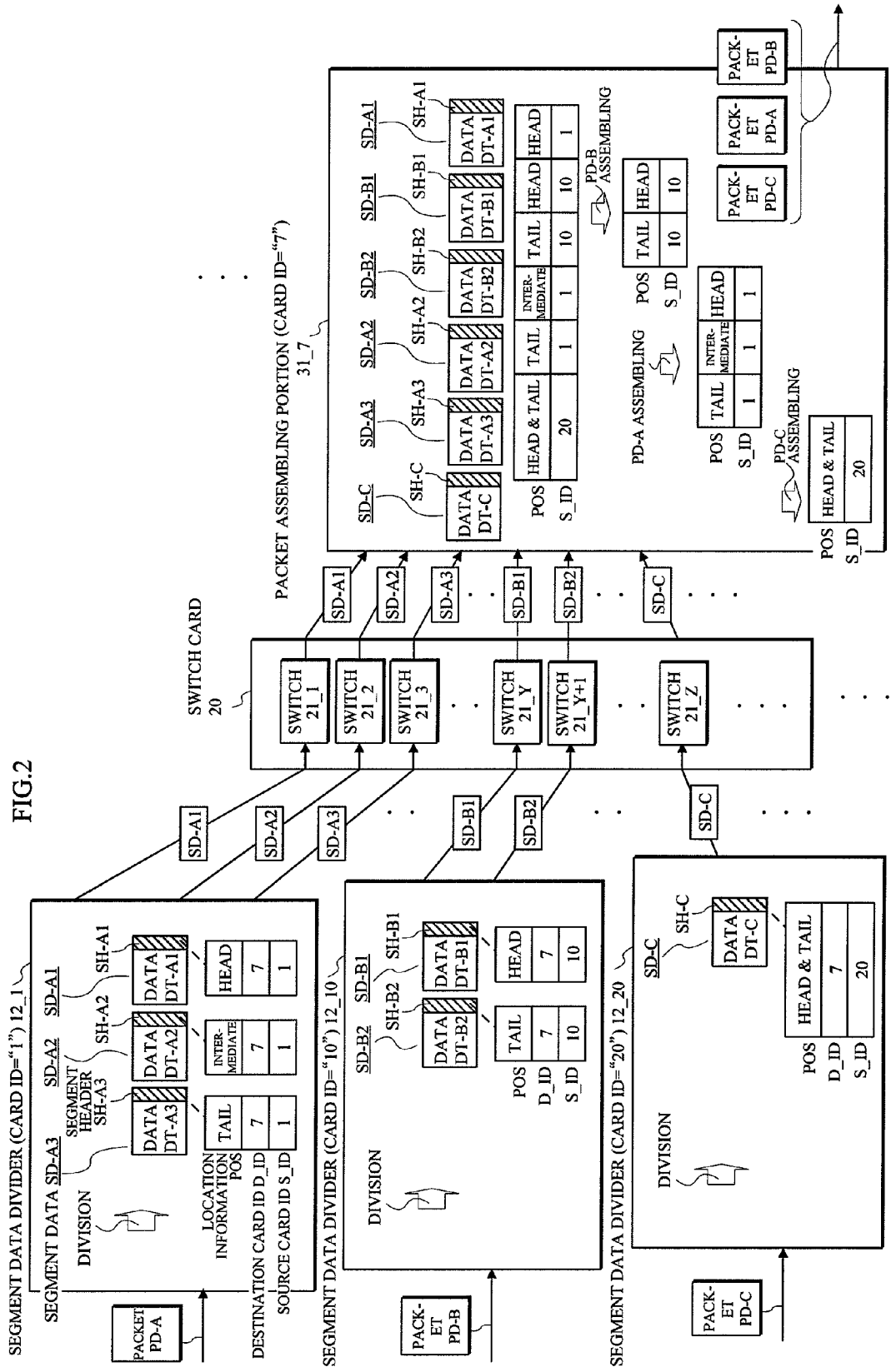
FIG. 2 is a block diagram showing an overall operation example of an embodiment [1] of a packet relay method and device according to the present invention.
Figure 3:
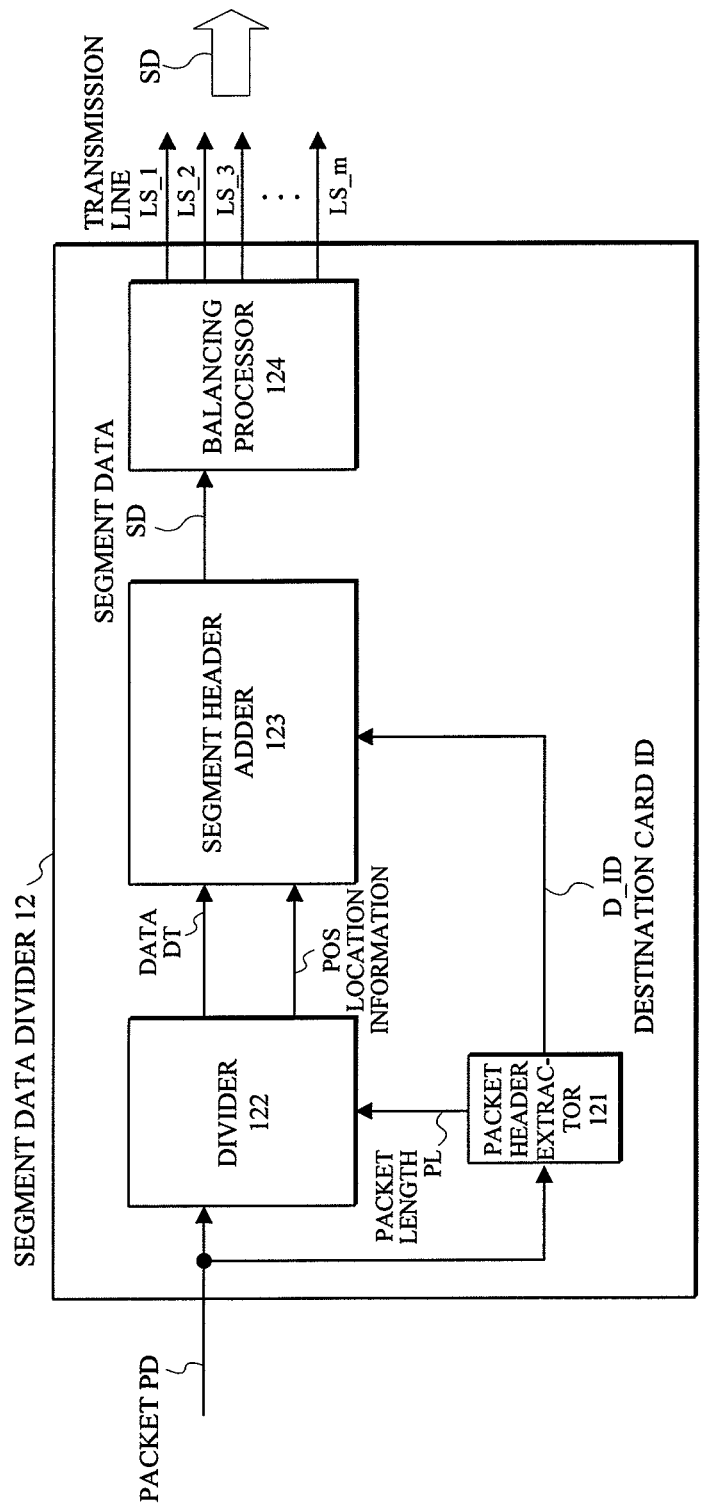
FIG. 3 is a block diagram showing an arrangement of a segment data divider used for an embodiment [1] of a packet relay method and device according to the present invention.
Figure 4A:
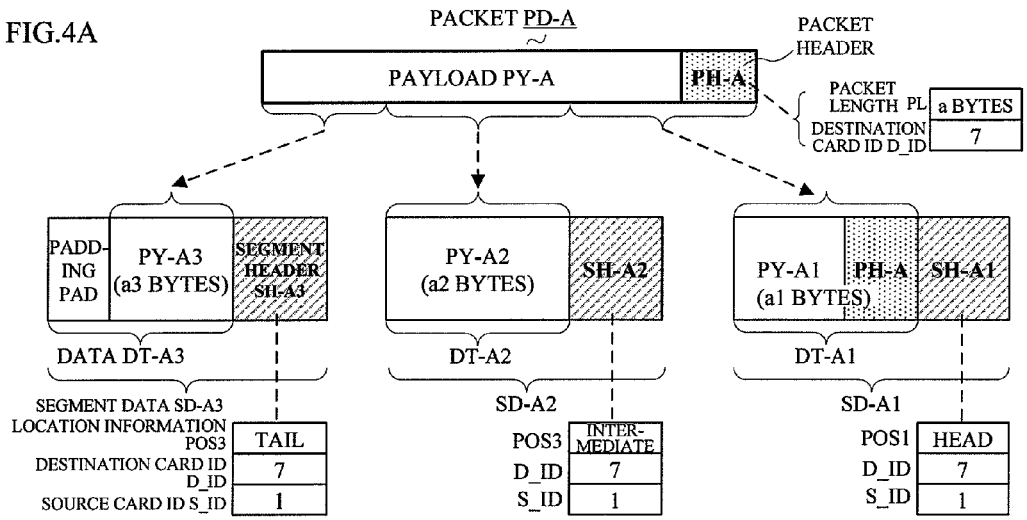
FIGS. 4A-4C are diagrams showing an operation example of a segment data generation of an embodiment [1] of a packet relay method and device according to the present invention.
Figure 4B:
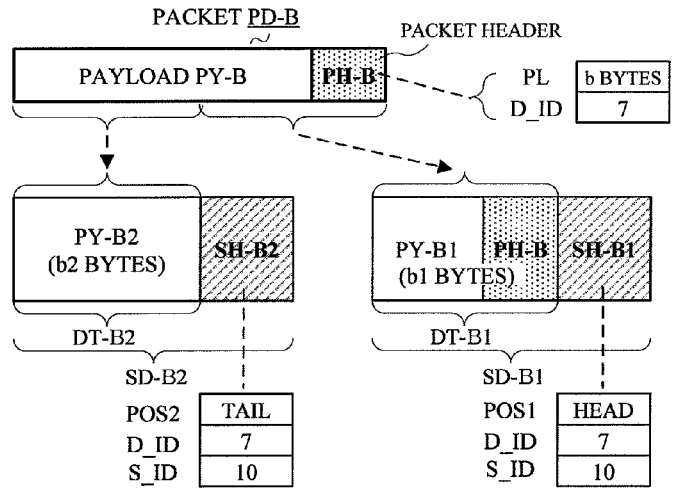
Figure 4C:
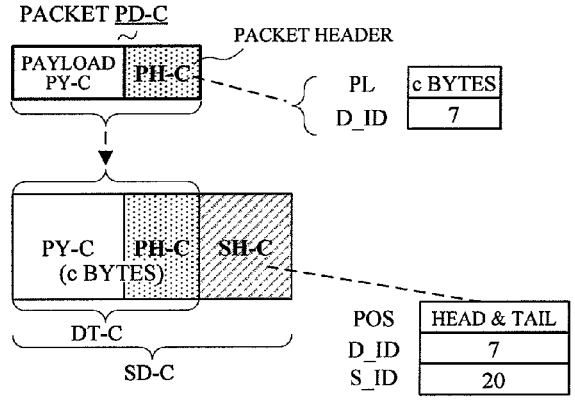
Figure 5:
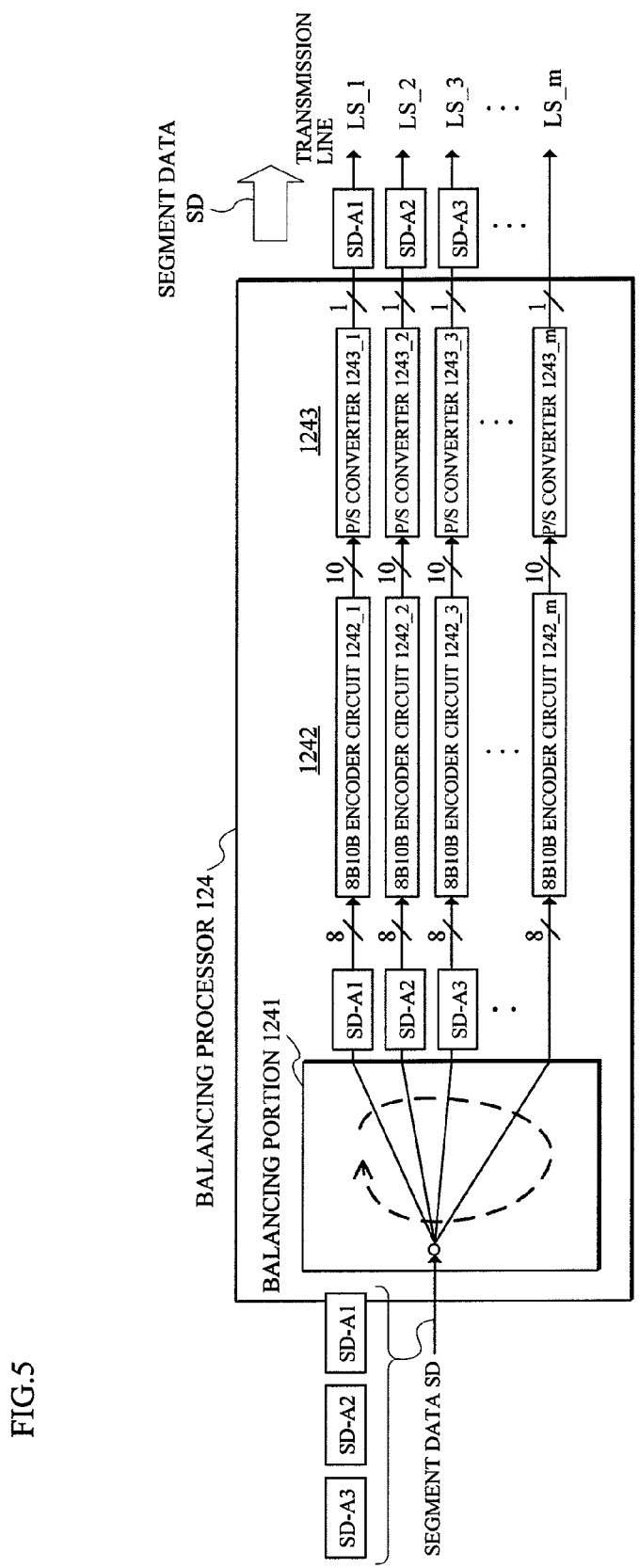
FIG. 5 is a block diagram showing an embodiment of a balancing processor used for a packet relay method and device according to the present invention.
Figure 6:
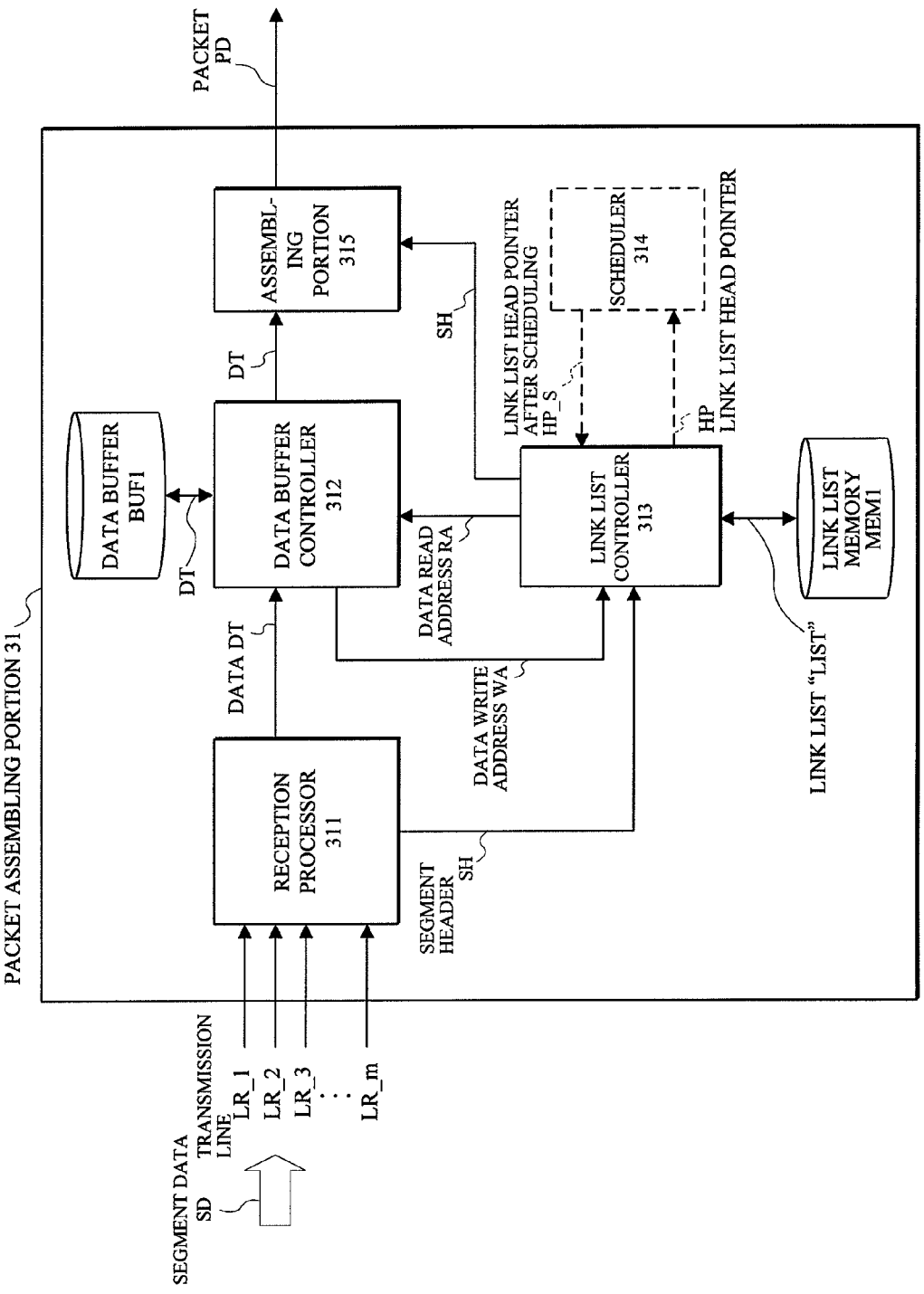
FIG. 6 is a block diagram showing an arrangement of a packet assembling portion used for an embodiment [1] of a packet relay method and device according to the present invention.
Figure 7:
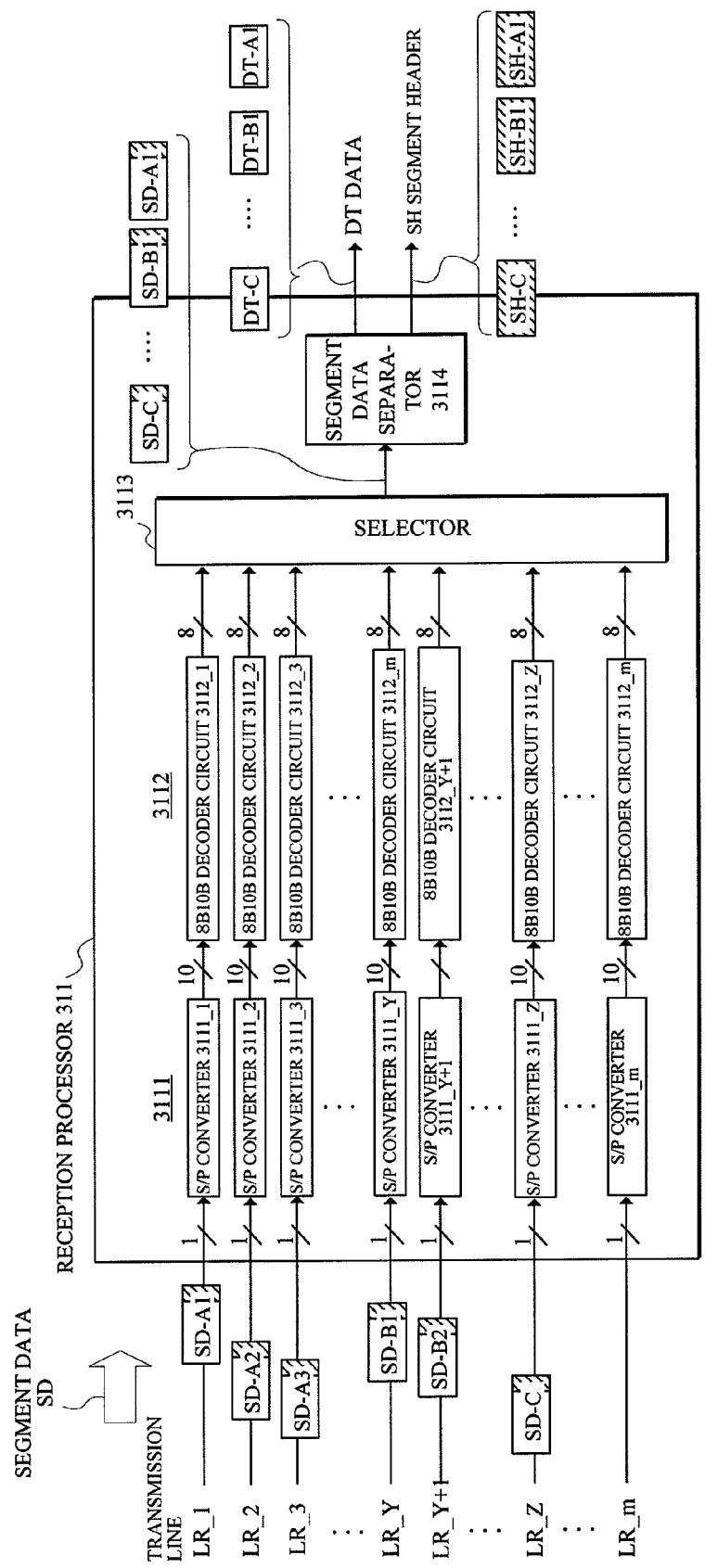
FIG. 7 is a block diagram showing an embodiment of a reception processor used for a packet relay method and device according to the present invention.
Figure 15:
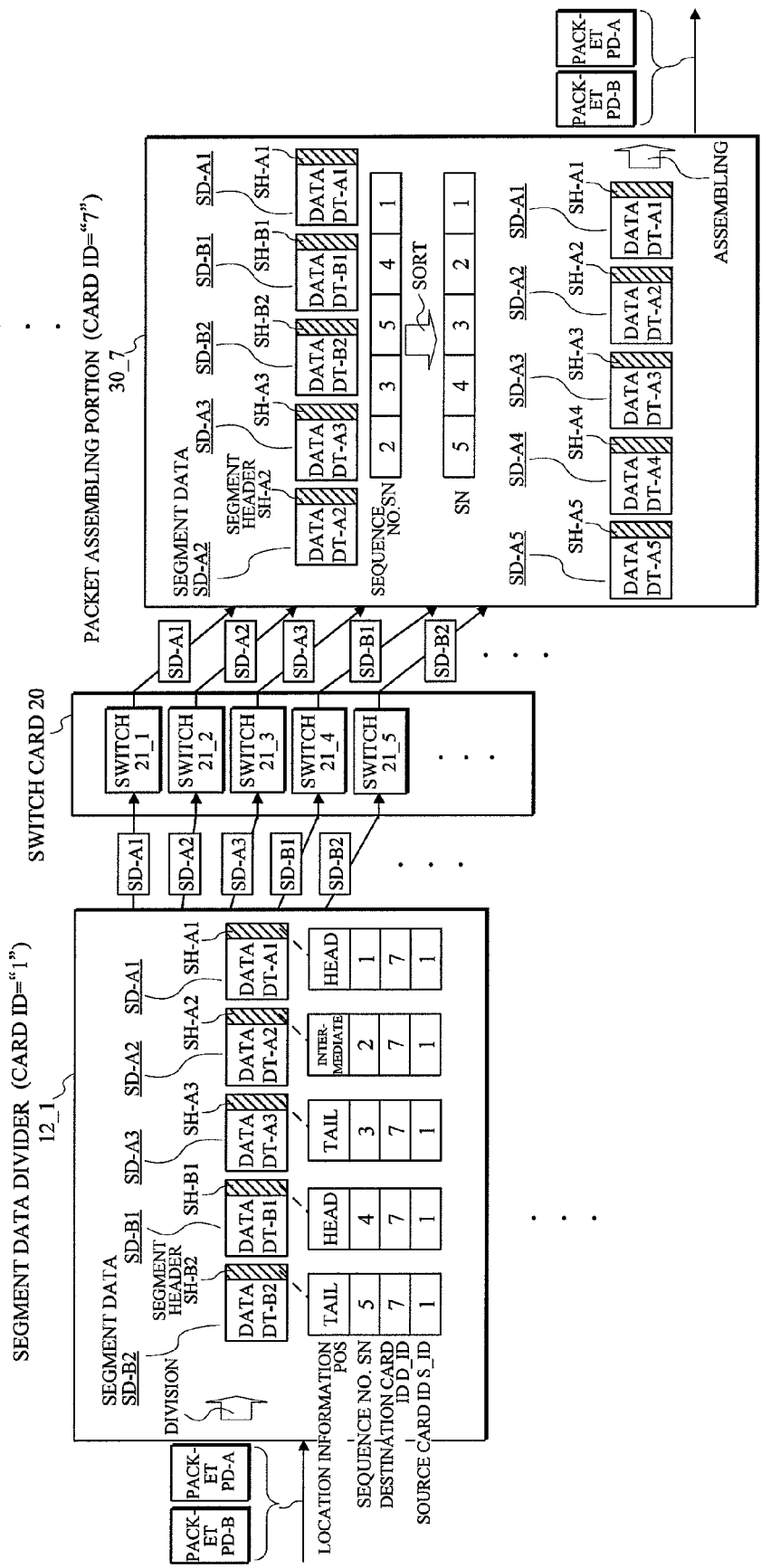
FIG. 15 is a block diagram showing an overall operation example of an embodiment [2] of a packet relay method and device according to the present invention.
Figure 16:
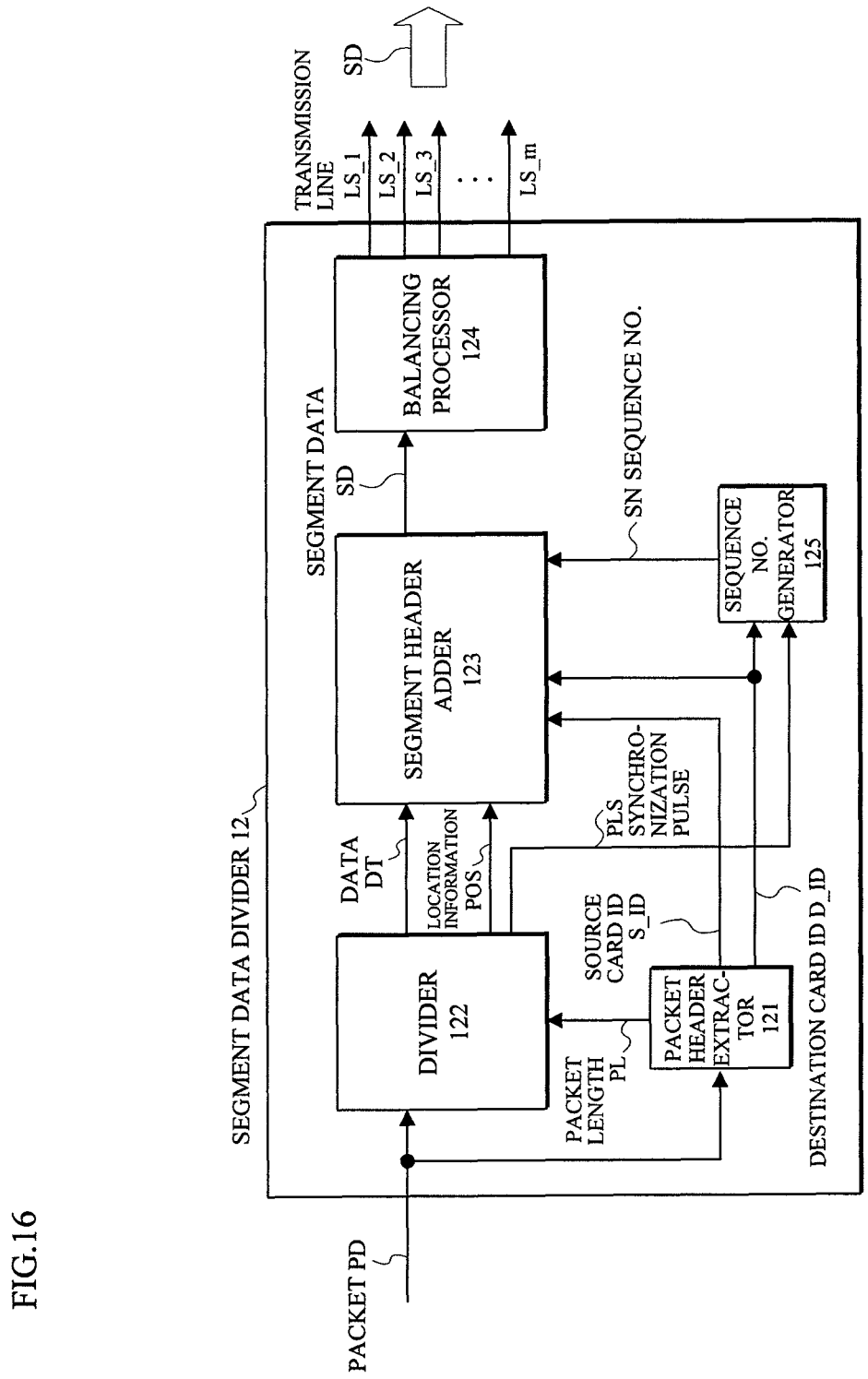
FIG. 16 is a block diagram showing an arrangement of a segment data divider used for an embodiment [2] of a packet relay method and device according to the present invention.
Figure 17:
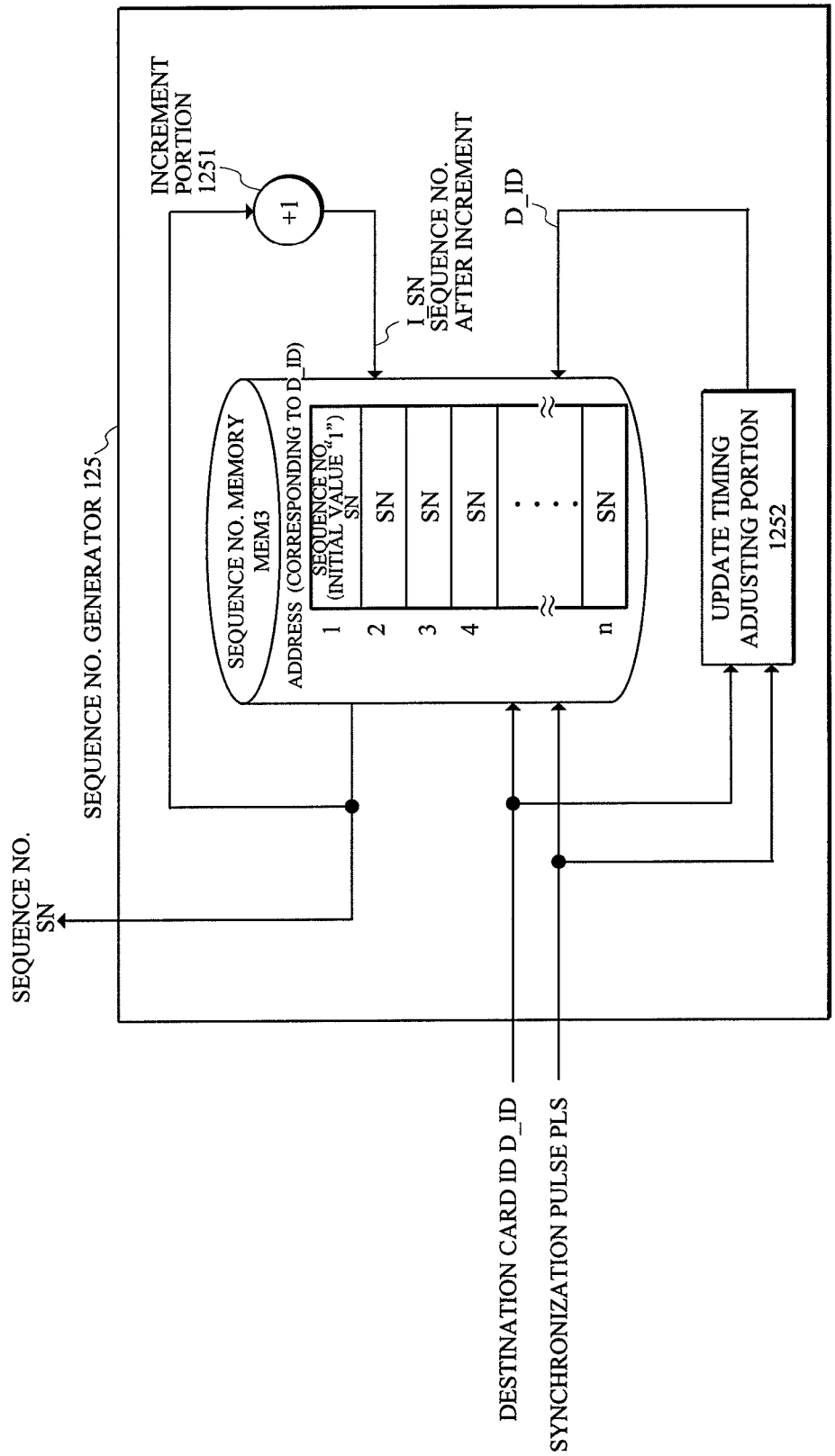
FIG. 17 is a block diagram showing an embodiment of a sequence No. generator used for an embodiment [2] of a packet relay method and device according to the present invention.
Figure 18A:
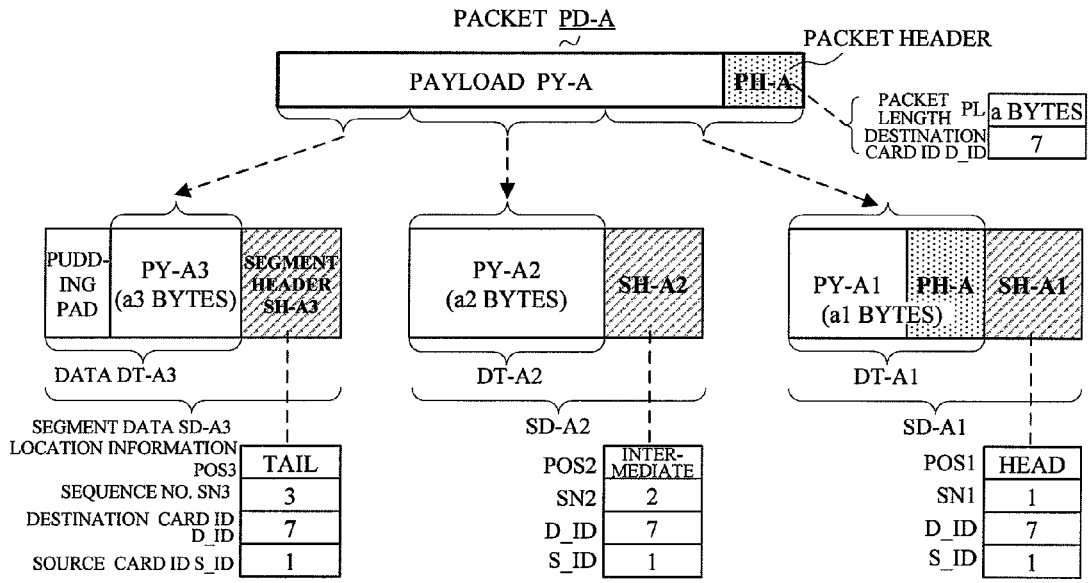
FIGS. 18A and 18B are diagrams showing an operation example of a segment data generation of an embodiment [2] of a packet relay method and device according to the present invention.
Figure 18B:
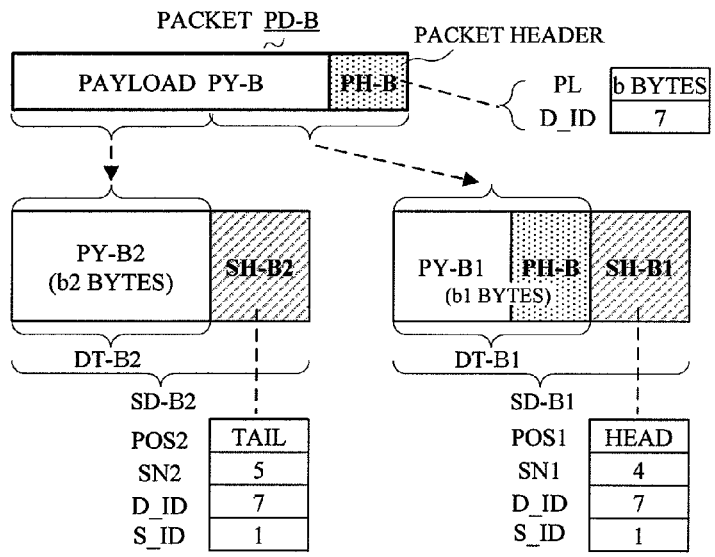
Figure 19:
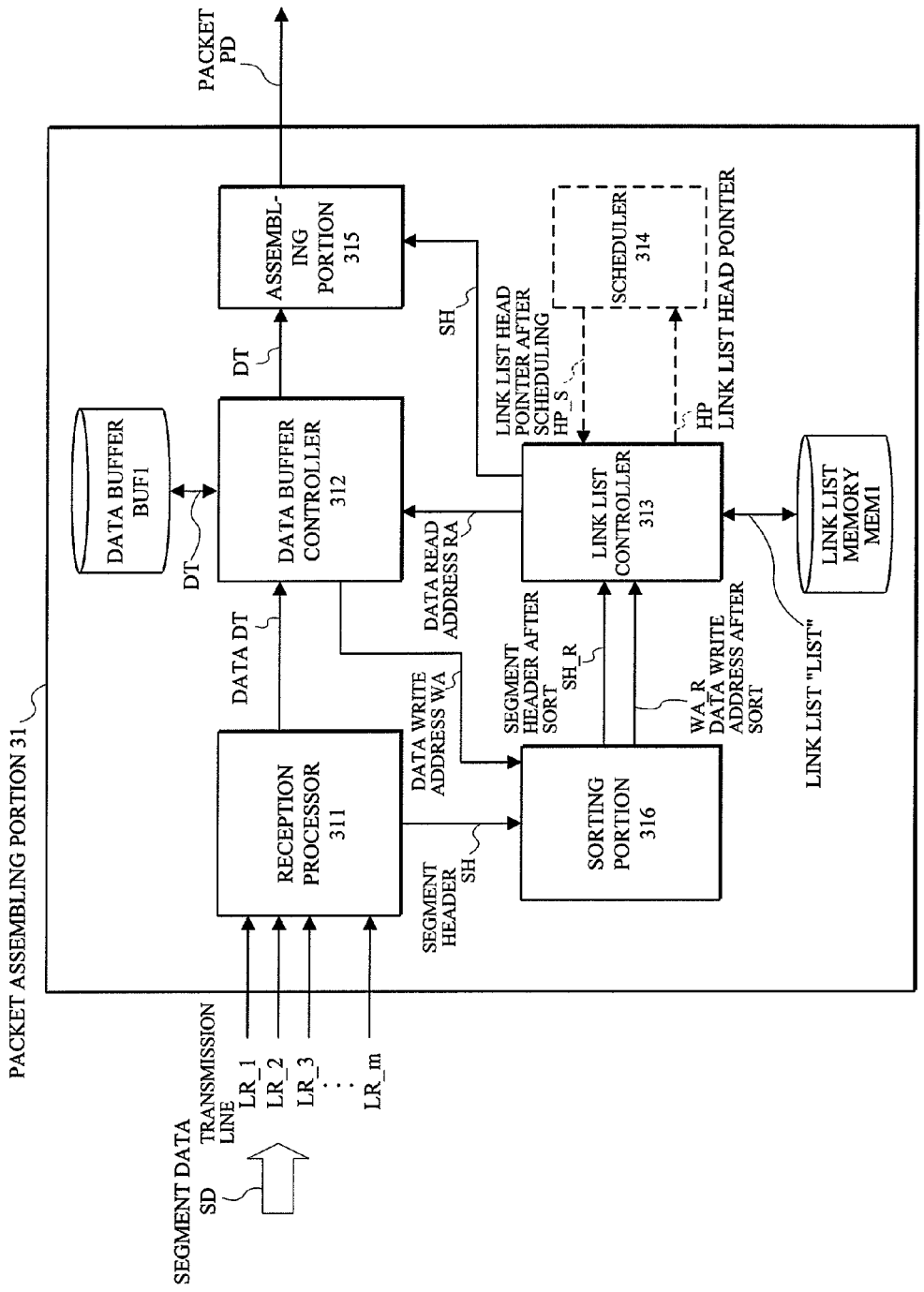
FIG. 19 is a block diagram showing an arrangement of a packet assembling portion used for an embodiment [2] of a packet relay method and device according to the present invention.

Embodiments [1] and [2] of the packet relay method and a device using the method according to the present invention will now be described referring to FIGS. 1-24 in the following order:

I. Overall arrangement of the present invention (common to both embodiments): FIG. 1
II. Embodiment [1]: FIGS. 2-14C
    II.1. Overall operation example: FIG. 2
    II.2. Arrangement of segment data divider: FIG. 3
    II.3. Operation example of segment data divider: FIGS. 4A-5
        II.3.A. Operation example of segment data generation: FIGS. 4A-4C
        II.3.B. Embodiment of balancing processor: FIG. 5
    II.4. Arrangement of packet assembling portion: FIG. 6
    II.5. Operation example of packet assembling portion: FIGS. 7-14C
        II.5.A. Embodiment of reception processor: FIG. 7
        II.5.B. Embodiment of data buffer controller: FIGS. 8-9B
        II.5.C. Embodiment of link list controller: FIGS. 10-14C
III. Embodiment [2]: FIGS. 15-24
    III.1. Overall operation example: FIG. 15
    III.2. Arrangement of segment data divider: FIG. 16
    III.3. Operation example of segment data divider: FIGS. 17-18B
        III.3.A. Embodiment of sequence No. generator: FIG. 17
        III.3.B. Operation example of segment data generation: FIGS. 18A and 18B
    III.4. Arrangement of packet assembling portion: FIG. 19
    III.5. Operation example of packet assembling portion: FIGS. 20-24
        III.6.A. Embodiment of sorting portion: FIGS. 20-24

I. Overall arrangement of present invention (common to both embodiments):FIG. 1

FIG. 1 shows an arrangement of a packet relay device 1 common to the embodiments [1] and [2] of the present invention.

Figure 25:
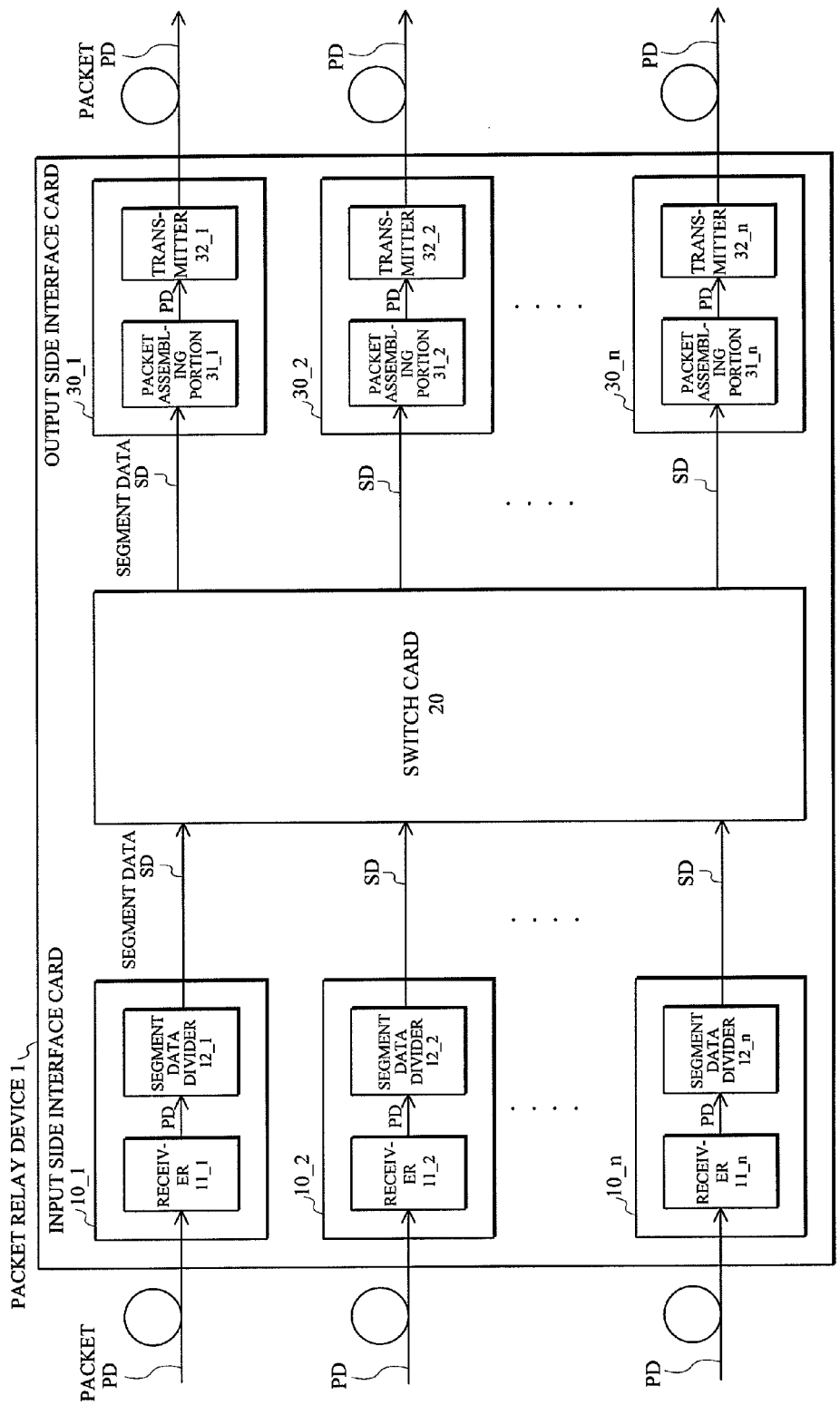
FIG. 25 is a block diagram showing a prior art packet relay device.

In this packet relay device 1, different from the prior art packet relay device shown in FIG. 25, the switch card 20 has "m" units of switches 21_1-21_m switches segment data SD in parallel.

Also, the input sides of the switches 21_1-21_m are connected to segment data dividers 12_1-12_n respectively with transmission lines LS1_1-LS1_m, LS2_1-LS2_m, . . . , LSn_1-LSn_m, and the output sides of the switches 21_1-21_m are connected to packet assembling portions 31_1-31_n respectively with transmission lines LR1_1-LR1m, LR2_1-LR2_m, LRn_1-LRn_m.

Also, card IDs "1"-"n" for uniquely identifying cards are assigned to input side interface cards 10_1-10_n that are on the transmitting side of the segment data SD, and similarly the card IDs "1"-"n" are assigned to output side interface cards 30_1-30_n that are on the receiving side of the segment data SD.

II. Embodiment [1]:FIGS. 2-14C

FIG. 2 shows the segment data dividers 12_1, 12_10, and 12_20, the switch card 20, and the packet assembling portion 31_7 respectively excerpted and emphasized as an example from the arrangement of the packet relay device 1 shown in FIG. 1. It is to be noted that in this embodiment, a case where the packet assembling portion 31_7 receives the segment data from three segment data dividers 12_1, 12_10, and 12_20 in parallel and the reception order thereof is the same as the transmission order from the segment data dividers 12_1, 12_10, and 12_20 will be described while a different case will be described in the following embodiment [2].

II.1. Overall operation example: FIG. 2

Hereinafter, an overall operation of this embodiment will be described referring to FIG. 2.

As shown in FIG. 2, the segment data divider 12_1 having received a packet PD-A divides the packet PD-A into e.g. three pieces of data DT-A1-DT-A3 of a predetermined length, and adds segment headers SH-A1-SH-A3 to the data DT-A1-DT-A3, thereby generating segment data SD-A1-SD-A3 to be transmitted to e.g. the switches 21_1-21_3 in parallel.

Location information POS indicating locations "head", "intermediate", and "tail" of the data DT-A1-DT-A3 within the packet PD-A, the card ID "7" of the packet assembling portion 31_7 as a destination card ID D_ID (destination address), and the card ID "1" of the segment data divider 12_1 itself as a source card ID S_ID (source address) are respectively set in the segment headers SH-A1-SH-A3.

The switches 21_1-21_3 respectively execute the switching according to the destination card IDs D_ID ("7") set in the segment headers S1-A1-S1-A3 within the segment data SD-A1-SD-A3, thereby providing the segment data SD-A1-SD-A3 to the packet assembling portion 31_7 in parallel.

Also, the segment data divider 12_10 having received a packet PD-B and the segment data divider 12_20 having received a packet PD-C respectively transmit e.g. two pieces of segment data SD-B1 and SD-B2 and e.g. one piece of segment data SD-C generated in the same way as the above to e.g. switches 21_Y and 21_Y+1, and e.g. the switch 21_Z in parallel.

Thus, the switching is performed respectively to the segment data SD-B1 and SD-B2 as well as SD-C in the same way as the above by the switches 21_Y and 21_Y+1 as well as 21_Z, and the segment data SD-B1 and SD-B2 as well as SD-C are provided to the packet assembling portion 31_7 in parallel.

It is now supposed that the packet assembling portion 31_7 has received the segment data SD-A1-SD-A3, SD-B1 and SD-B2, and SD-C to which the switching is performed, in order of the segment data SD_A1→SD-B1→SD-B2→SD-A2→SD-A3→SD-C as shown in FIG. 2.

In this case, a series of segment data (namely segment data for one packet) from the head to the tail received at first is the segment data SD-B1 and SD-B2 from the source card ID S_ID="10", so that the packet assembling portion 31_7 recognizes this based on the location information POS and the source card ID S_ID set in segment headers SH-B1 and SH-B2 within the segment data SD-B1 and SD-B2, and combines data DT-B1 and DT-B2 within the segment data SD-B1 and SD-B2 to assemble the packet PD-B to be transmitted to the subsequent stage.

Then, the packet assembling portion 31_7 recognizes that the segment data from the source card ID S_ID="1" for one packet from the head to the tail have been received based on the location information POS and the source card ID S_ID set in the segment headers SH-A1-SH-A3 within the segment data SD-A1 firstly received, and the segment data SD-A2 and SD-A3 received after the segment data SD-B2, and combines the data DT-A1-DT-A3 within the segment data SD-A1-SD-A3 to assemble the packet PD-A to be transmitted to the subsequent stage.

Finally, the packet assembling portion 31_7 recognizes that the segment data from the source card ID S_ID="20" for one packet of the head and the tail has been received, based on the location information POS and the source card ID S_ID set in a segment header SH-C within the segment data SD-C, and extracts data DT-C within the segment data SD-C to be transmitted to the subsequent stage as the packet PD-C.

Hereinafter, the arrangements and the operation examples of the segment data divider 12 and the packet assembling portion 31 which realize the above-mentioned operation will be described referring to FIGS. 3-14C.

II.2. Arrangement of segment data divider: FIG. 3

The segment data divider 12 shown in FIG. 3 is composed of a packet header extractor 121 for extracting the destination card ID D_ID and a packet length PL from the packet PD having received, a divider 122 for dividing the packet PD into data DT of a predetermined length based on the extracted packet length PL and generating the location information POS indicating a location of each data DT within the packet PD respectively, a segment header adder 123 for adding to each data DT the segment header in which the location information POS, the destination card ID D_ID, the card ID of the segment data divider 12 itself as the source card ID S_ID are respectively set to generate the segment data SD, and a balancing processor 124 for transmitting the segment data SD to the transmission lines LS_1-LS_m in parallel.

II.3. Operation example of segment data divider: FIGS. 4A-5

The operation of the segment data divider 12 shown in FIG. 3 will be described. Firstly, an example of the segment data generation by the packet header extractor 121, the divider 122, and the segment header adder 123 will be described referring to FIGS. 4A-4C. Then, the embodiment of the balancing processor 124 will be described referring to FIG. 5.

II.3.A. Example of segment data generation: FIGS. 4A-4C

In the example of the segment data generation, a generation process of the segment data SD-A1-SD-A3, SD-B1 and SD-B2, and SD-C will be described by taking the packets PD-A-PD-C shown in FIG. 2 as an example.

When receiving the packet PD-A, the packet header extractor 121 firstly extracts, as shown in FIG. 4A, the packet length PL="a bytes" and the destination card ID D_ID="7" from a packet header PH-A within the packet PD-A, and provides the extracted packet length PL and destination card ID D_ID respectively to the divider 122 and the segment header adder 123.

The packet header extractor 121 extracts the packet length PL in order to make the divider 122 determine how many data DT the packet PD is divided into, since the received packet PD is a variable-length packet.

The divider 122 divides the packet PD-A based on the packet length PL into the data DT-A1 of "a1" bytes including the packet header PH-A and PY-A1 which is a part of a payload PY-A, the data DT-A2 of "a2" (=a1) bytes including only a payload PY-A2, and the data DT-A3 where a pudding PAD is added to a payload PY-A3 for "a3" (<a1) bytes, and sequentially provides the divided data to the segment header adder 123. Concurrently, the divider 122 generates the location information POS1="head", POS2="intermediate", and POS3="tail" of the data DT-A1-DT-A3 respectively to be sequentially provided to the segment header adder 123.

The segment header adder 123 generates the segment data SD-A1-SD-A3 where the segment headers SH-A1-SH-A3 in which the location information POS1-POS3, the destination card ID D_ID, and the source card ID S_ID are respectively set are added to the data DT-A1-DT-A3 to be sequentially provided to the balancing processor 124.

Also, when receiving the packet data PD-B and PD-C, the segment data SD-B1 and SD-B2 shown in FIG. 4B as well as the segment data SD-C shown in FIG. 4C are generated in the same way as the above.

II.3.B. Embodiment of balancing processor: FIG. 5

The balancing processor 124 shown in FIG. 5 has a balancing portion 1241 for circulating the segment data SD to be transmitted to the transmission lines LS_1-LS_m, circuits 1242_1-1242_m (hereinafter, occasionally represented by a reference numeral 1242) provided between the balancing portion 1241 and the transmission lines LS_1-LS_m and for encoding the segment data SD according to an 8B/10B encoding rule, and P/S converters 1243_1-1243_m (hereinafter, occasionally represented by a reference numeral 1243) for performing a parallel/serial conversion to the encoded segment data SD.

It is to be noted that the 8B/10B encoder circuit 1242 and the P/S converter 1243 are not essential, which may be provided when the segment data SD is desired to be transmitted at a high speed to the switch card 20.

In operation, three pieces of segment data SD-A1-SD-A3 shown in FIG. 4A being taken as an example, the balancing portion 1241 provides the segment data SD-A1 firstly received to e.g. the 8B/10B encoder circuit 1242_1, and the segment data SD-A2 and SD-A3 continuously received to the 8B/10B encoder circuits 1242_2 and 1242_3 respectively.

After being encoded respectively by the 8B/10B encoder circuits 1242_1-1243_3 and parallel/serial converted by the P/S converters 1243_1-1243_3, the segment data SD-A1-SD-A3 are transmitted to the switch card 20 through the transmission lines LS_1-LS_3.

Thereafter, every time continuous segment data (not shown) is received, the balancing portion 1241 circulates the segment data to be provided to the 8B/10B encoder circuit 1242_4→1242_5→ . . . →1242_m→1242_1→ . . . , so that the segment data are transmitted to the switch card 20 through the transmission line LS_4→LS_5→ . . . →LS_m→LS_1→ . . . .

Thus, the segment data SD can be provided to the switch card 20 in parallel, so that the switches 21_1-21_m within the switch card 20 can be equally used.

II.4. Arrangement of packet assembling portion: FIG. 6

The packet assembling portion 31 shown in FIG. 6 is composed of a reception processor 311 for receiving the segment data SD to which the switching is performed by the switch card 20 through the transmission lines LR_1-LR_m in parallel and sequentially separating the segment data into the data DT and the segment header SH to be outputted, a data buffer controller 312 for sequentially writing the separated data DT in a data buffer BUF1 and outputting a data write address WA thereof, a link list controller 313 for preparing a link list LIST associating each segment header SH outputted from the reception processor 311 with each data write address WA outputted from the data buffer controller 312 to be stored in a link list memory MEM1 and outputting a head pointer HP of the prepared link list LIST, a scheduler 314 providing to the link list controller 313 a link list head pointer HP_S obtained by performing scheduling (e.g. processing of making the input order of the link list head pointer HP (preparing order of link list LIST) a priority output order as it is) to the pointer HP to make the link list controller 313 refer to the link list LIST corresponding to the pointer HP_S, and an assembling portion 315 for combining the data DT, read from the buffer BUF1 by providing the address WA obtained by referring to the link list LIST as a data read address RA to the data buffer controller 312, based on the segment data SH obtained by referring to the link list LIST to assemble the packet PD.

It is to be noted that the scheduler 314 is not essential. When the scheduler 314 is not provided, the link list controller 313 may refer to the link list LIST concurrently every time it prepares the link list LIST.

II.5. Operation example of packet assembling portion: FIGS. 7-14C

Hereinafter, the operation of the packet assembling portion 31 shown in FIG. 6 will be described referring to FIGS. 7-14C in order of the embodiments of the reception processor 311, the data buffer controller 312, and the link list controller 313.

II.5.A. Embodiment of reception processor: FIG. 7

The reception processor 311 shown in FIG. 7 has S/P converters 3111_1-3111_m (hereinafter, occasionally represented by a reference numeral 3111) for receiving the segment data SD to which the switching is performed by the switch card 20 through the transmission lines LR_1-LR_m in parallel and for performing the serial/parallel conversion to the segment data SD, circuits 3112_1-3112_m (hereinafter, occasionally represented by a reference numeral 3112) for decoding the segment data SD serial/parallel converted according to the 8B/10B encoding rule, a selector 3113 for sequentially outputting the decoded segment data SD, and a segment data separator 3114 for sequentially separating the segment data SD outputted from the selector 3113 into the data DT and the segment header SH.

It is to be noted that the S/P converter 3111 and the 8B/10B decoder circuit 3112 are provided corresponding to the 8B/10B encoder circuit 1242 and the P/S converter 1243 shown in FIG. 5, which are not essential.

In operation, the segment data SD-A1-SD-A3, SD-B1 and SD-B2, and SD-C shown in FIG. 2 being taken as an example, these segment data are received through the transmission lines LS-A1-LS-A3, LS-Y and LS-Y+1, and LS-Z, serial/parallel converted and decoded by the S/P converter 3111 and the 8B/10B decoder circuit 3112, and then provided to the selector 3113.

Since the reception of the segment data in order of SD-A1→SD-B1→SD-B2→SD-A2→SD-A3→SD-C has been taken as an example as shown in FIG. 2, the selector 3113 firstly provides the segment data SD-A1 to the segment data separator 3114, and the separate data separator 3114 separates the segment data SD-A1 into the data DT-A1 and the segment header SH-A1 and provides the data DT-A1 to the data buffer controller 312 and the segment header SH-A1 to the link list controller 313.

Thereafter, in the same way as the above, the data are provided to the data buffer controller 312 in order of DT-B1→DT-B2→DT-A2→DT-A3→DT-C, and the segment headers are provided to the link list controller 313 in order of SH-B1→SH-B2→SH-A2→SH-A3→SH-C.

II.5.B. Embodiment of data buffer controller: FIGS. 8-9B

The data buffer controller 312 shown in FIG. 8 has a free address FIFO buffer BUF2 for storing therein a free address of the data buffer BUF1.

Also, the data buffer BUF1 is divided into addresses A1-Ak to store data DT1-DTk one by one in each of the addresses, wherein "k" may be set to a maximum number of segment data which can be received in a single packet assembling portion 31.

Figure 9A:
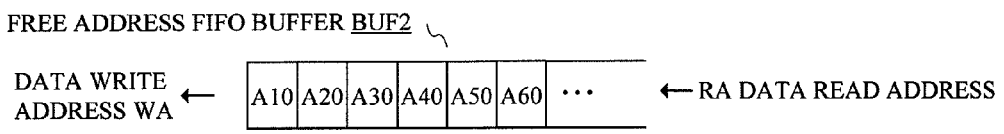
FIGS. 9A and 9B are diagrams showing an operation example of a data buffer controller used for a packet relay method and device according to the present invention.
Figure 9B:
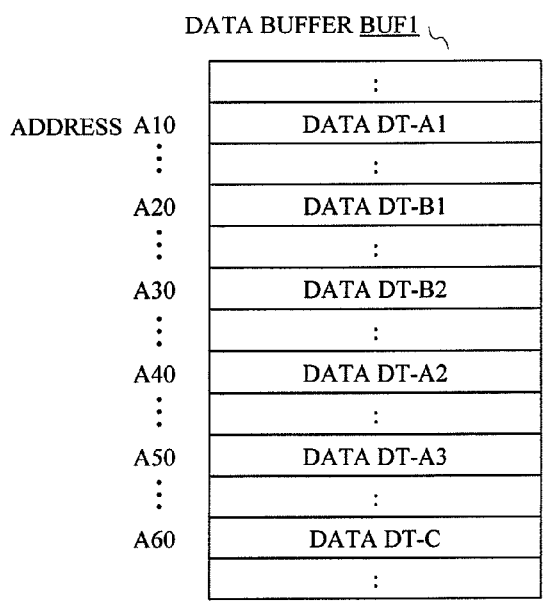

It is now supposed as shown in FIG. 9A that free addresses A10, A20, A30, A40, A50, and A60 of the buffer BUF1 are stored in the free address FIFO buffer BUF2.

The data are provided from the reception processor 311 shown in FIG. 7 in order of DT-A1→DT-B1→DT-B2→DT-A2→DT-A3→DT-C. Therefore, in the write operation to the data buffer BUF1, the data buffer controller 312, as shown in FIGS. 9A and 9B, pops the address A10 off the free address FIFO buffer BUF2 to write the data DT-A1 in the address A10 of the data buffer BUF1, and provides the data write address WA="A10" to the link list controller 313.

Thereafter, the data buffer controller 312, in the same way as the above, sequentially writes the data DT-B1, DT-B2, DT-A2, DT-A3, and DT-C in the addresses A20, A30, A40, A50, and A60 of the data buffer BUF1, and sequentially provides the data write address WA="A20", "A30", "A40", "A50", and "A60" to the link list controller 313.

Also, in the read operation from the data buffer BUF1, every time the data read address RA is received from the link list controller 313 as will be described later, the data buffer controller 312 reads the data DT from the address RA of the data buffer BUF1 to be provided to the assembling portion 315. Concurrently, the address RA having been completely read is stored in the free address FIFO buffer BUF2.

II.5.C. Embodiment of link list controller: FIGS. 10-14C

Figure 10:
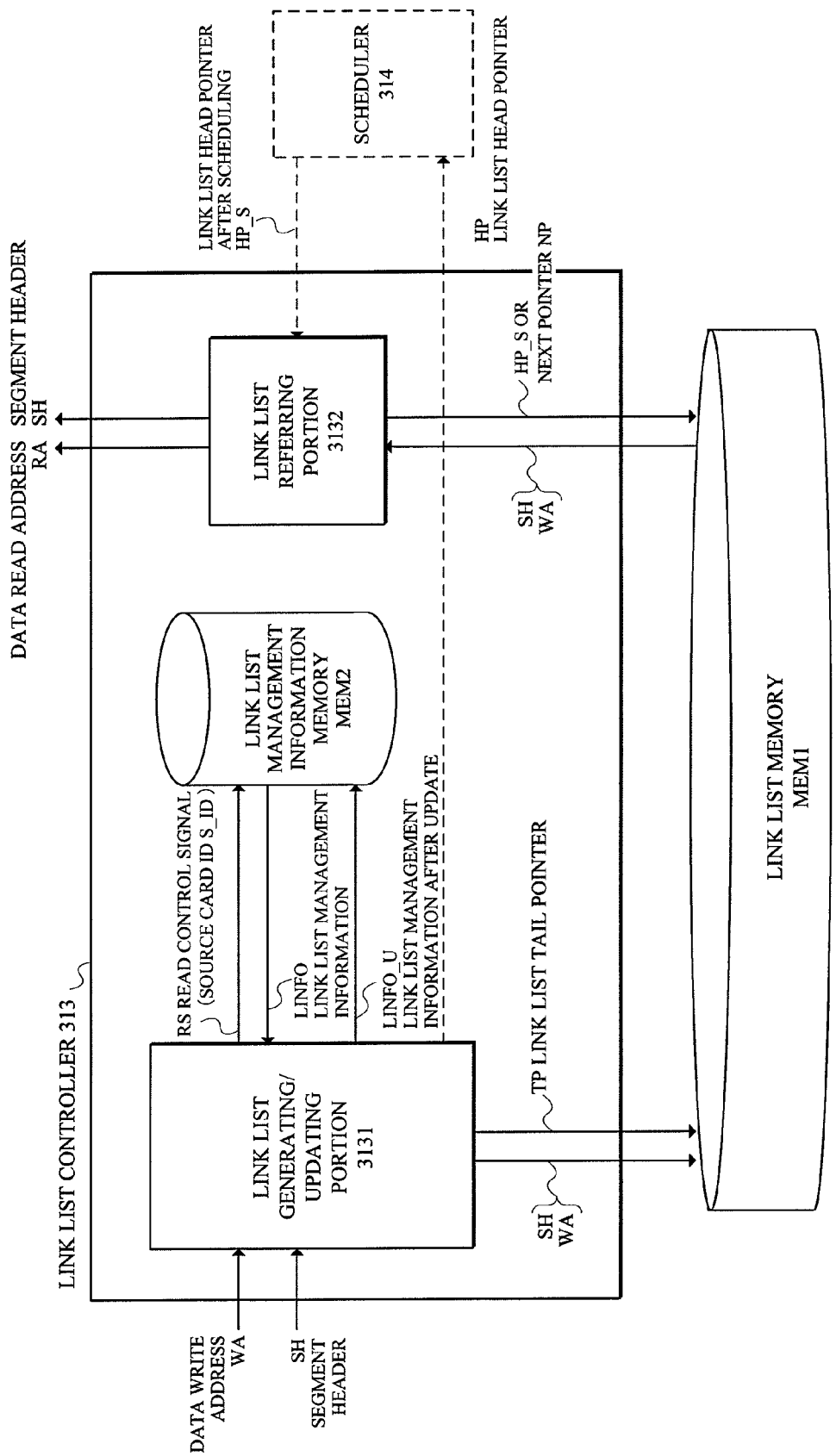
FIG. 10 is a block diagram showing an arrangement of a link list controller used for a packet relay method and device according to the present invention.

The link list controller 313 shown in FIG. 10 has a link list generating/updating portion 3131 for generating or updating a link list associating the data write address WA with the segment header SH in a link list memory MEM1 by referring to a link list tail pointer TP within link list management information LINFO read by providing a read control signal RS to a link list management information memory MEM2 every time the data write address WA and the segment header SH are received, updating the link list management information LINFO (writing link list management information LINFO_U after update in the memory MEM2), and providing a head pointer HP of the link list prepared to the scheduler 314, and a link list referring portion 3132 for sequentially referring to the link list corresponding to a link list head pointer HP_S after the scheduling and sequentially outputting the segment header SH and the data read address RA (data write address WA obtained by referring to link list).

Also, as shown in FIG. 11A, the link list management information memory MEM2, where the addresses 1–n correspond to the source card ID S_ID in a one-on-one manner, is arranged so that link list management information LINFO1-LINFOn composed of the link list head pointer HP and the link list tail pointer TP per source card ID S_ID can be stored.

Also, as shown in FIG. 11B, the link list memory MEM1, where the addresses A1-Ak correspond to the data write addresses WA in a one-on-one manner (namely, divided so as to have the same address series as those of the data buffer BUF1 shown in FIG. 8), is arranged so that the segment header SH and the next pointer (next data write address) NP may be stored per data write address WA.

Namely, as shown in FIG. 11C, the link list management information LINFOn for the source card ID S_ID="n" is stored in an address "n" of the link list management information memory MEM2, and a list LISTn where the data write address WA and the segment header SH from the source card ID S_ID="n" are logically linked in the reception order thereof is stored in the link list memory MEM1. Also, the link list head pointer HP and tail pointer TP within the link list management information LINFOn indicate physical addresses within the link list memory MEM1 in which the head record and the tail record within the link list LISTn are stored.

In operation, the link list generating/updating portion 3131 prepares the link list LIST for each of the segment data dividers 12_1, 12_10, and 12_20 shown in FIG. 2, i.e. for the source card ID S_ID="1", "10", and "20" as the follows:

Namely, as shown in FIG. 12A, the link list generating/updating portion 3131 firstly receives the segment header SH-A1 and the data write address WA="A10". At this time, the link list generating/updating portion 3131 recognizes that the source card ID S_ID set in the segment header SH-A1 is "1", and provides the read control signal RS (source card ID S_ID="1") to the link list management information memory MEM2, thereby reading the link list management information LINFO1 from the address "1".

The link list generating/updating portion 3131 further recognizes that the location information POS set in the segment header SH-A1 is "head" (namely, it is necessary to newly generate a link list for the source card ID S_ID="1"), updates the link list head pointer HP1 and the tail pointer TP1 within the link list management information LINFO1 to "A10", and writes the segment header SH-A1 in the address "A10" of the link list memory MEM1.

When receiving the segment header SH-B1 and the data write address WA="A20" as shown in FIG. 12B, the link list generating/updating portion 3131 updates the link list head pointer HP10 and the tail pointer TP10 within the link list management information LINFO10 to the address "A20" in the same way as the above, and writes the segment header SH-B1 in the address "A20" of the link list memory MEM1.

When receiving the segment header SH-B2 and the data write address WA="A30" as shown in FIG. 12C, the link list generating/updating portion 3131 recognizes that the location information POS set in the segment header SH-B2 is "tail" (namely, it is necessary to update the link list for the source card ID S_ID="10"), writes the address "A30" in the next pointer NP in the address "A20" of the link list memory MEM1 by referring to the link list tail pointer TP10 within the link list management information LINFO10, and writes the segment header SH-B2 in the address "A30" of the memory MEM1. The link list generating/updating portion 3131 updates the link list tail pointer TP10 to the address "A30".

Since the location information POS in the segment header SH-B2 indicates "tail" at this time, the link list generating/updating portion 3131 recognizes that the preparation of a link list LIST10-B has been completed, and provides the head pointer HP10 of the link list LIST10-B to the scheduler 314.

When receiving the segment header SH-A2 and the data write address WA="A40" as shown in FIG. 12D, the link list generating/updating portion 3131 recognizes that the location information POS set in the segment header SH-A2 is "intermediate" (namely, it is necessary to update the link list for the source card ID S_ID="1"), writes the address "A40" in the next pointer NP in the address "A10" of the link list memory MEM1 by referring to the link list tail pointer TP1 within the link list management information LINFO1, and writes the segment header SH-A2 in the address "A40" of the memory MEM1. The link list generating/updating portion 3131 updates the link list tail pointer TP1 to the address "A40".

When receiving the segment header SH-A3 and the data write address WA="A50" as shown in FIG. 12E, the link list generating/updating portion 3131 recognizes that the location information POS set in the segment header SH-A3 is "tail", writes the address "A50" in the next pointer NP in the address "A40" of the link list memory MEM1 by referring to the link list tail pointer TP1, and writes the segment header SH-A3 in the address "A50" of the memory MEM1. The link list generating/updating portion 3131 updates the link list tail pointer TP1 to the address "A50".

Since the location information POS in the segment header SH-A3 indicates "tail", the link list generating/updating portion 3131 completes the preparation of a link list LIST1-A, and provides the head pointer HP1 of the link list LIST1-A to the scheduler 314.

Figure 13:
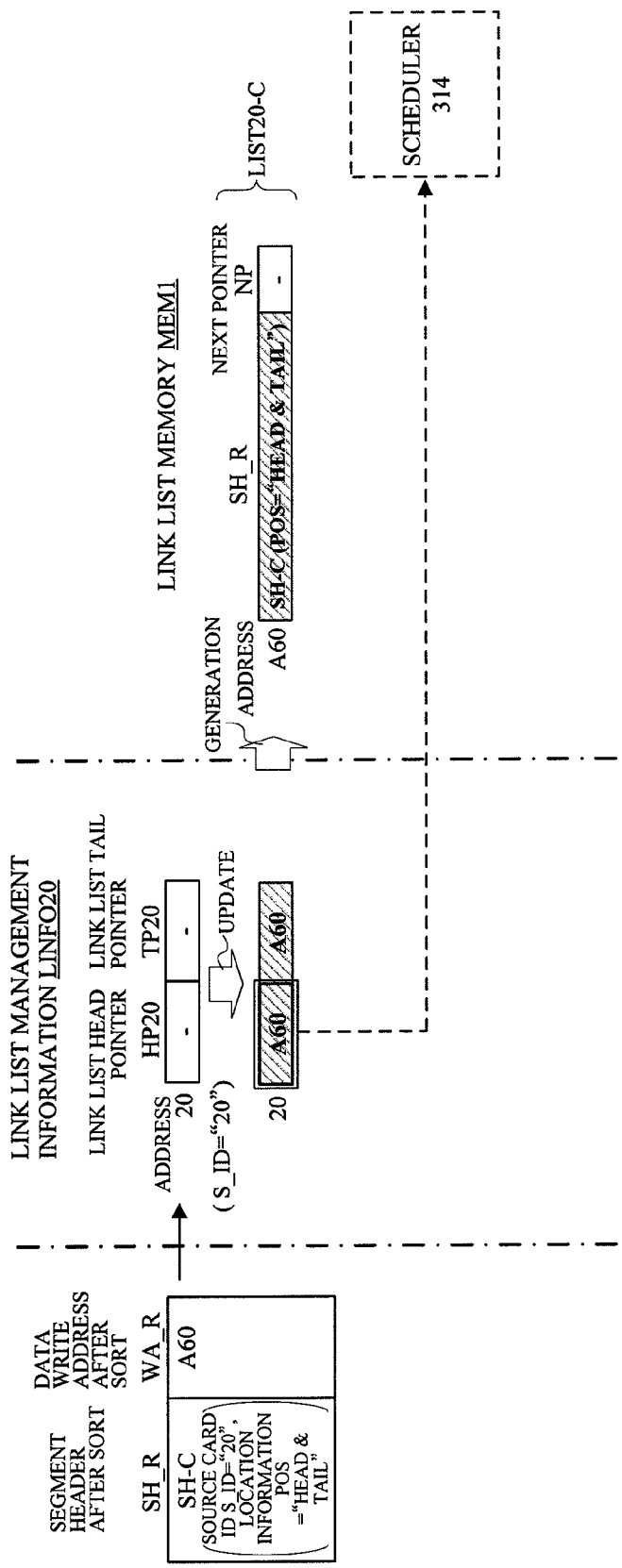
FIG. 13 is a diagram showing an operation example (No. 2) of a link list generating/updating portion used for a packet relay method and device according to the present invention.
Figure 14:
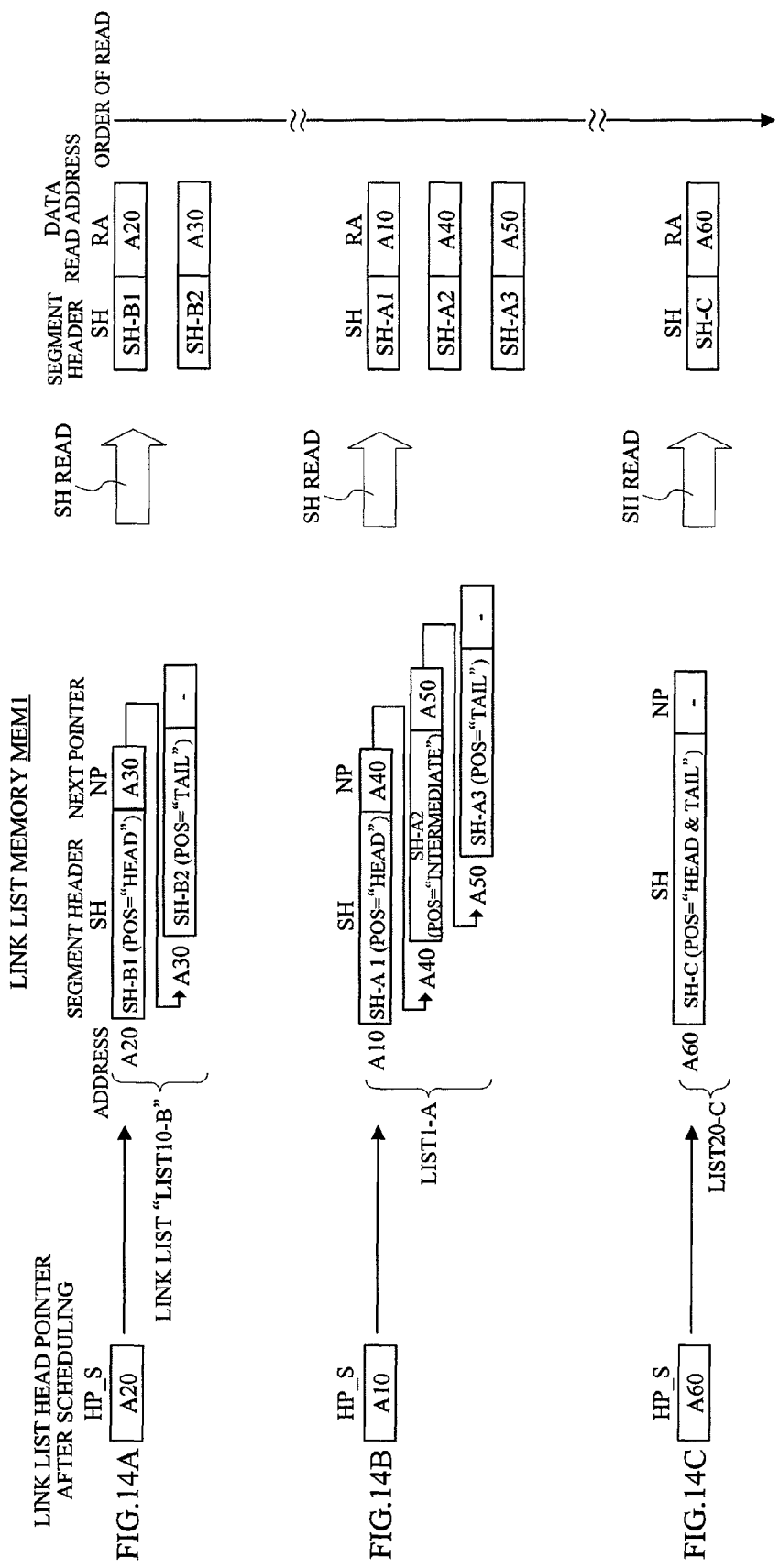
FIGS. 14A-14C are diagrams showing an operation example of a link list referring portion used for a packet relay method and device according to the present invention.

When receiving the segment header SH-C and the data write address WA="A60" as shown in FIG. 13, the link list generating/updating portion 3131 updates the link list head pointer HP20 and the tail pointer TP20 within the link list management information LINFO20 to the address "A60", and writes the segment header SH-C in the address "A60" of the link list memory MEM1.

Since the location information POS indicates "head and tail" at this time, the link list generating/updating portion 3131 immediately completes the preparation of a link list LIST20-C, and provides the head pointer HP20 of the link list LIST20-C to the scheduler 314.

Also, in the referring operation of the link list LIST, taking a case where the scheduler 314 performs the scheduling in a preparation order of the link list LIST (LIST1-A→LIST10-B→LIST20-C) as an example as shown in FIG. 14A, the address "A20" is firstly provided to the link list referring portion 3132 as the link list head pointer HP_S after the scheduling.

The link list referring portion 3132 having received the address refers to the address "A20" of the link list memory MEM1, i.e. the record at the head of the link list LIST10-B to read the segment header SH-B1, provides the segment header SH-B1 to the assembling portion 315, and provides the address "A20" to the data buffer controller 312 as the data read address RA.

The link list referring portion 3132 acquires the address "A30" of the next record from the next pointer NP, reads the segment header SH-B2 by referring to the address "A30", provides the segment header SH-B2 to the assembling portion 315, and provides the address "A30" to the data buffer controller 312 as the data read address RA. Since an address of the next record is not set in the next pointer NP at this time, the link list referring portion 3132 completes the reference of the link list LIST10-B.

Thus, in the data buffer controller 312, the data DT-B1 and DT-B2 corresponding to the data read addresses RA="A30" and "A40" of the data buffer BUF1 are sequentially read and provided to the assembling portion 315. The assembling portion 315 combines the data DT-B1 and DT-B2 based on the location information POS set in the segment headers SH1-B1 and SH-B2 to assemble the original packet PD-B.

As shown in FIG. 14B, the link list referring portion 3132 having received the link list head pointer HP_S="A10" after scheduling from the scheduler 314 reads the segment headers SH-A1-SH-A3 sequentially by referring to the link list LIST1-A, sequentially provides the segment headers SH-A1-SH-A3 to the assembling portion 315, and sequentially provides the addresses "A10", "A40", and "A50" to the data buffer controller 312 as the data read address RA.

Thus, the data DT-A1-DT-A3 corresponding to the data read addresses RA="A10", "A40", and "A50" are sequentially read from the data buffer BUF1 to assemble the packet PD-A where the data DT-A1-DT-A3 are combined based on the location information POS set in the segment headers SH-A1-SH-A3.

As shown in FIG. 14C, the link list referring portion 3132 having received the link list head pointer HP_S="A60" after scheduling from scheduler 314 reads the segment header SH-C by referring to the link list LIST20_C, provides the segment header SH-C to the assembling portion 315, and provides the address "A60" to the data buffer controller 312 as the data read address RA.

Thus, the data DT-C corresponding to the data read address RA="A60" is read from the data buffer BUF1 and made the packet PD-C as it is.

Thus, the original packet can be correctly assembled per source card ID from the segment data having received from a plurality of segment data dividers in parallel.

III. Embodiment [2]: FIGS. 15-24

FIG. 15 shows the segment data divider 12_1, the switch card 20, and the packet assembling portion 31_7 excerpted and emphasized as an example from the arrangement of the packet relay device 1 shown in FIG. 1. The packets PD-A and PD-B shown in FIG. 2 are both inputted to the segment data divider 12_1. Different from the above-mentioned embodiment [1], this embodiment deals with a case where the reception order of the segment data in the packet assembling portion 31_7 is different from the transmission order of the segment data divider 12_1.

III.1. Overall operation example: FIG. 15

Hereinafter, the overall operation of this embodiment will be described referring to FIG. 15.

Firstly, the segment data divider 12_1 having received the packet PD-A sets, in the segment headers SH-A1-SH-A3, sequence Nos. SN="1"-"3" in addition to the location information POS, the destination card ID D_ID, and the source card ID S_ID described in the above-mentioned embodiment [1], and transmits the segment data SD-A1-SD-A3 generated to the switches 21_1-21_3 in parallel in the same way as the above-mentioned embodiment [1].

When receiving the packet PD-B, the segment data divider 12_1 transmits to the switches 21_4 and 21_5 in parallel the segment data SD-B1 and SD-B2 where the sequence Nos. SN="4" and "5" are respectively set in the segment headers SH-B1 and SH-B2.

The switches 21_1-21_5, like the above-mentioned embodiment [1], respectively execute the switching according to the destination card ID D_ID ("7") set in the segment headers SH-A1-SH-A3 as well as SH-B1 and SH-B2 within the segment data SD-A1-SD-A3 as well as SD-B1 and SD-B2, and provide the segment data SD-A1-SD-A3 as well as SD-B1 and SD-B2 to the packet assembling portion 31_7 in parallel.

It is supposed that the switching loads of the switches 21_1-21_5 are not equal, and the packet assembling portion 31_7 receives the segment data SD-A1-SD-A3 as well as SD-B1 and SD-B2 to which the switching is performed in order of the segment data SD-A1 (sequence No. SN="1")→SD-B1 (SN="4")→SD-B2 (SN="5")→SD-A3 (SN="3")→SD-A2 (SN="2") as shown in FIG. 5, which is different from the transmission order at the segment data divider 12_1.

In this case, the packet assembling portion 31_7 sorts the segment data having received in order of the segment data SD-A1 (sequence No. SN="1")→SD-A2 (SN="2")→SD-A3 (SN="3")→SD-B1 (SN="4")→SD-B2 (SN="5") based on the sequence No. SN in advance of the packet assembling operation described in the above-mentioned embodiment [1].

Thus, the packet assembling portion 31_7 can combine the data DT-A1-DT-A3 within the segment data SD-A1-SD-A3 as well as the data DT-B1 and DT-B2 within the segment data SD-B1 and SD-B2 to assemble the packets PD-A and PD-B in the same way as the above-mentioned [1].

Hereinafter, the arrangement and the operation example of the segment data divider 12 and the packet assembling portion 31 which realize the above-mentioned operation will be described referring to FIGS. 16-24.

III.2. Arrangement of segment data divider: FIG. 16

The segment data divider 12 shown in FIG. 16 has a sequence No. generator 125 for generating the sequence No. SN to be provided to the segment header adder 123 every time the destination card ID D_ID outputted from the packet header extractor 121 and a pulse PLS in synchronization with the output of the location information POS from the divider 122 are received, in addition to the arrangement of the above-mentioned embodiment [1].

III.3. Operation example of segment data divider: FIGS. 17-18B

The operation of the segment data divider 12 shown in FIG. 16 will now be described. Firstly, the embodiment of the sequence No. generator 125 will be described referring to FIG. 17. Then, the operation example of a segment data generation by the packet header extractor 121, the divider 122, and the segment header adder 123 will be described referring to FIGS. 18A and 18B.

It is to be noted that the operation of the balancing processor 124 is the same as the above-mentioned embodiment [1], so that the description thereof will be omitted.

III.3.A. Embodiment of sequence No. generator: FIG. 17

The sequence No. generator 125 shown in FIG. 17 has a sequence No. memory MEM3 for associating addresses 1–n with the destination card ID D_ID in a one-on-one manner and storing the sequence No. SN per destination card ID D_ID, an increment portion 1251 for incrementing the sequence No. SN read from the memory MEM3 by "1", and an update timing adjusting portion 1252 for adjusting a write (update) timing to the memory MEM3 of the sequence No. I_SN incremented.

In operation, every time the destination card ID D_ID and the synchronization pulse PLS are inputted into the sequence No. generator 125, the sequence No. SN is read from the sequence No. memory MEM3 with the destination card ID D_ID as an address to be provided to the segment header adder 123.

Also, after the sequence No. SN is read from the sequence No. memory MEM3, the update timing adjusting portion 1252 provides the inputted destination card ID D_ID to the sequence No. memory MEM3 as a write address of the sequence No. I_SN incremented by the increment portion 1251.

Thus, the sequence No. SN sequentially added by 1 per destination card ID D_ID is provided to the segment header adder 123.

III.3.B. Operation example of segment data generation: FIGS. 18A and 18B

As shown in FIG. 18A, taking a case where the packet PD-A shown in FIG. 15 is received as an example, the packet data extractor 121 firstly extracts the packet length PL="a bytes" and the destination card ID D_ID="7" from the packet header PH-A within the packet PD-A in the same way as the above-mentioned embodiment [1], and provides the packet length PL extracted to the divider 122. However, different from the above-mentioned embodiment [1], the packet header extractor 121 provides the destination card ID D_ID to the segment header adder 123 and the sequence No. generator 125.

The divider 122, in the same way as the above-mentioned embodiment [1], divides the packet PD-A into the data DT-A1, DT-A2, and DT-A3 based on the packet length PL to be sequentially provided to the segment header adder 123, and sequentially provides the location information POS1-POS3 of the data DT-A1-DT-A3 to the segment header adder 123. Concurrently, the divider 122 sequentially provides the synchronization pulse PLS for the location information POS1-POS3 to the sequence No. generator 125, different from the above-mentioned embodiment [1].

The sequence No. generator 125 generates the sequence Nos. SN1-SN3 ("1"-"3") for the destination card ID D_ID="7" to be sequentially provided to the segment header adder 123.

The segment header adder 123 generates, different from the above-mentioned embodiment [1], the segment data SD-A1-SD-A3 where the segment headers SH-A1-SH-A3 in which the sequence Nos. SN1-SN3 are respectively set in addition to the location information POS1-POS3, the destination card ID D_ID, and the source card ID S_ID are added to the data DT-A1-DT-A3 to be sequentially provided to the balancing processor 124.

Also, when the packet data PD-B shown in FIG. 15 is received, the segment data SD-B1 (sequence No. SN="4") and SD-B2 (SN="5") shown in FIG. 18B are generated and provided to the balancing processor 124 in the same way as the above.

III.4. Arrangement of packet assembling portion: FIG. 19

The packet assembling portion 31 shown in FIG. 19 has, in addition to the arrangement of the above-mentioned embodiment [1], a sorting portion 316 for inputting the segment header SH outputted from the reception processor 311 and the data write address WA outputted from the data buffer controller 312 to be sorted, and for providing the segment header SH_R and the data write address WA_R after sort to the link list controller 313.

III.5. Operation example of packet assembling portion: FIGS. 20-24

Hereinafter, the operation of the packet assembling portion 31 shown in FIG. 19 will be described. Since the operation of the reception processor 311, the data buffer controller 312, the link list controller 313, the scheduler 314, and the assembling portion 315 is common to the above-mentioned embodiment [1], the description thereof will be omitted, where the embodiment of only the sorting portion 316 will be described referring to FIGS. 20-24.

III.5.A. Embodiment of sorting portion: FIGS. 20-24

Figure 20:
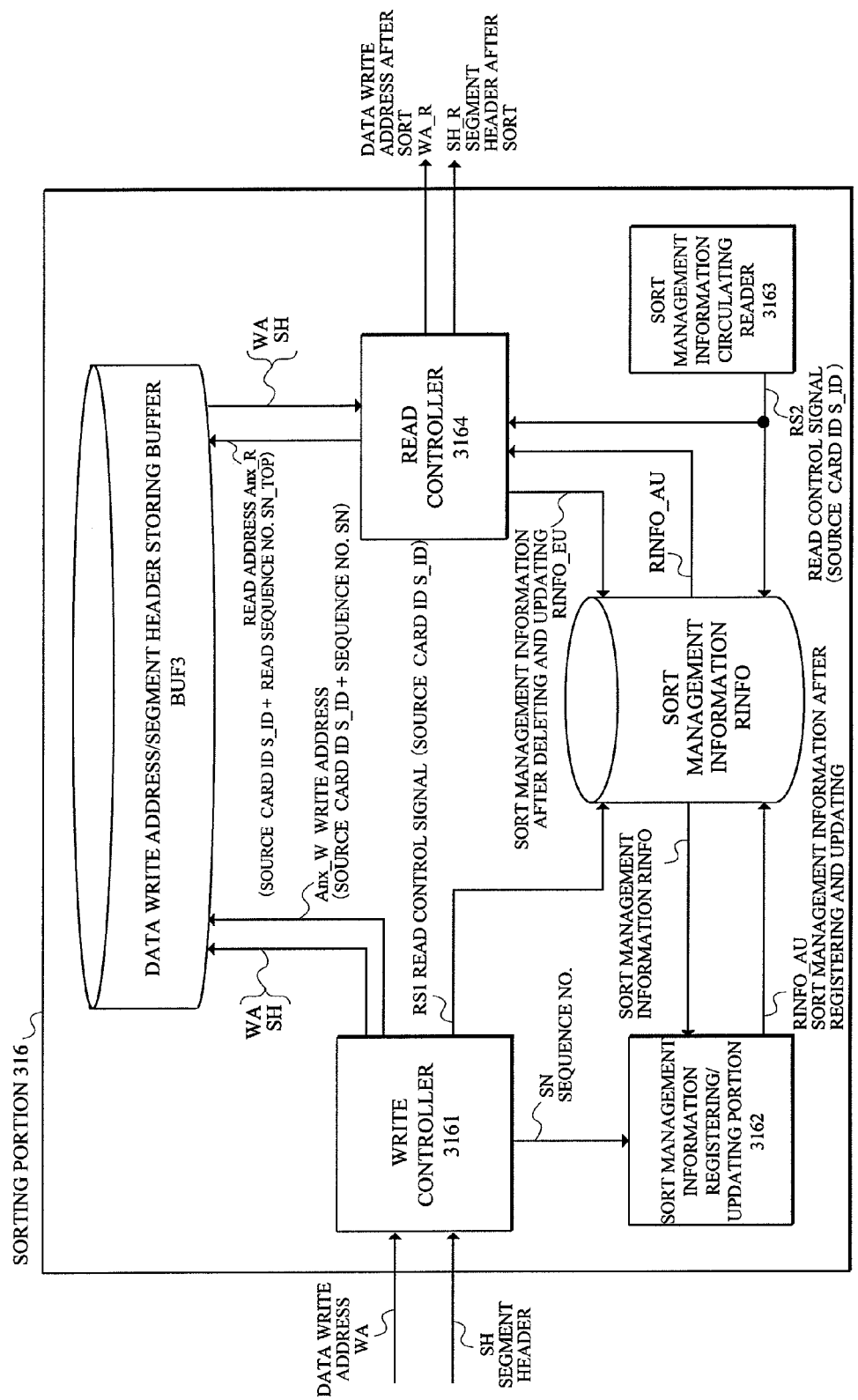
FIG. 20 is a block diagram showing an arrangement of a sorting portion used for an embodiment [2] of a packet relay method and device according to the present invention.

The sorting portion 316 shown in FIG. 20 has a buffer BUF3 for storing the data write address WA and the segment data SH having received from the data buffer controller 312 and the reception processor 311, a write controller 3161 for writing the data write address WA having received in a write address Anx_W of the buffer BUF3 with the source card ID S_ID and the sequence No. SN set in the segment header SH as a key every time the data write address WA and the segment header SH are received and for outputting the sequence No. SN and a read control signal RS1 of sort management information RINFO, a sort management information registering/updating portion 3162 for registering and updating the sequence No. SN outputted from the write controller 3161 in the read sort management information RINFO, a sort management information circulating reader 3163 for circulating and reading sort management information RINFO_AU after the registering and updating per source card ID S_ID by outputting a read control signal RS2, and a read controller 3164 for reading the data write address WA and the segment header SH from a read address Anx_R of the buffer BUF3 with the source card ID S_ID set in the read management information RINFO_AU and a read sequence No. SN_TOP to be read next for the source card ID S_ID as a key, providing the data write address WA_R and the segment header SH_R after sort to the link list controller 313, deleting and updating the read sequence No. SN_TOP from the management information RINFO_AU.

Also, the data write address/segment header storing buffer BUF3 is arranged, as shown in FIG. 21A, so that addresses "11"–"nx" are associated with the combination of the sequence Nos. SN of the segment data="1"–"x" having received from the source card IDs S_ID="1"–"n" (namely, divided so that the write control and the read control can be performed with the source card ID S_ID+sequence No. SN as an address), and the data write address WA and the segment header SH can be stored per source card ID S_ID and per sequence No. SN.

"x" may be set to a maximum sequence No. of the segment data which can be received in a single packet assembling portion 31.

Also, the sort management information RINFO, where the addresses 1–n are associated with the source card ID S_ID in a one-on-one manner, is composed of, as shown in FIG. 21B, a read sequence Nos. SN_TOP of the segment data to be read next per source card ID S_ID, and a flag F indicating whether or not the segment header SH in which the sequence Nos. SN="1"–"x" is set is written in the data write address/segment header storing buffer BUF3.

It is supposed that in this embodiment the sort management information RINFO is used as shown in (a) of FIG. 21B. Namely, the address "n" of the sort management information RINFO is used as sort management information RINFOn for the source card ID S_ID="n". When the segment headers SH corresponding to the sequence Nos. SN="1"–"x" are written in the data write address/segment header storing buffer BUF3, the flags F are set to "1" respectively. When the segment header SH is not received or the segment header SH is read from the data write address/segment header storing buffer BUF3, the flag F is set to "0".

Also, whether or not the segment header SH can be read from the data write address/segment header storing buffer BUF3 is determined based on the setting value of the flag F corresponding to the read sequence No. SN_TOP. In the state shown in FIG. 21B, the flag F corresponding to the read sequence No. SN_TOP="3" is set to "0", so that the sorting portion 316 waits for the segment header SH where the sequence No. SN="3" is set to be written in the data write address/segment header storing buffer BUF3.

It is to be noted that since the initial value of the sequence No. SN is made "1" in this embodiment, all of the read sequence Nos. SN_TOP in the sort management information RINFO are set to "1" in the initial state.

Figure 22:
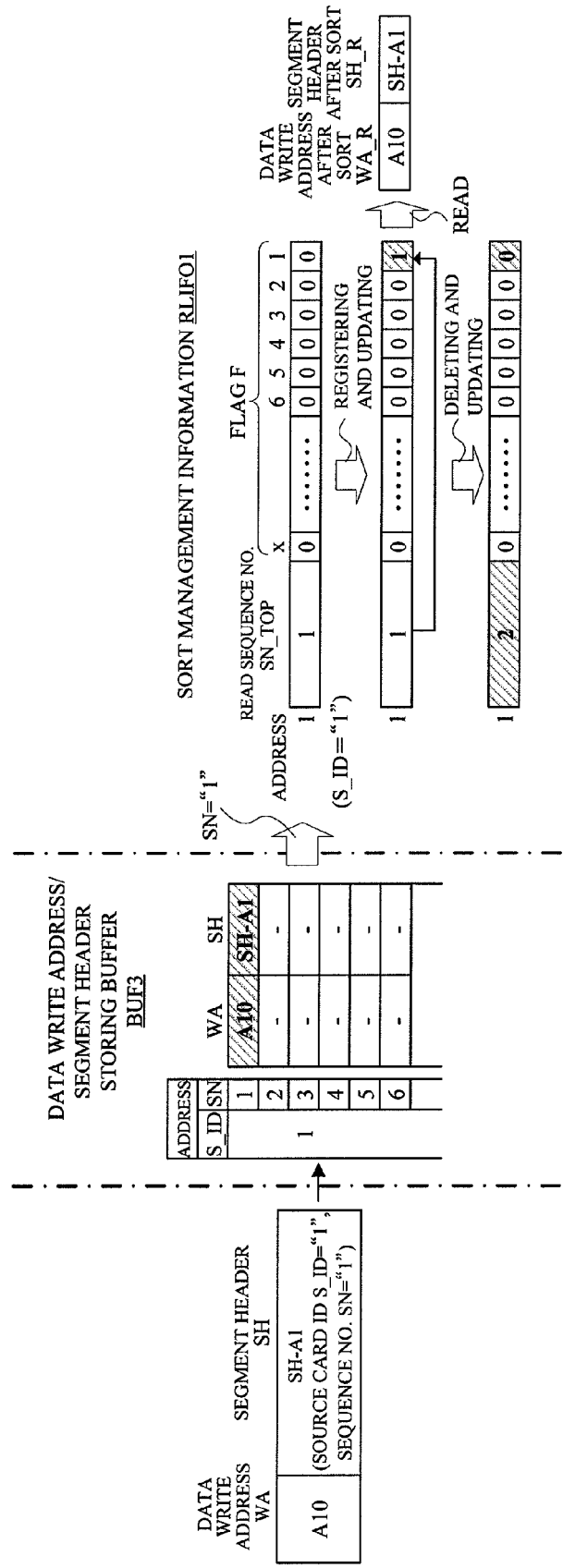
FIG. 22 is a diagram showing an operation example (No. 1) of a sorting portion used for an embodiment [2] of a packet relay method and device according to the present invention.
Figure 23:
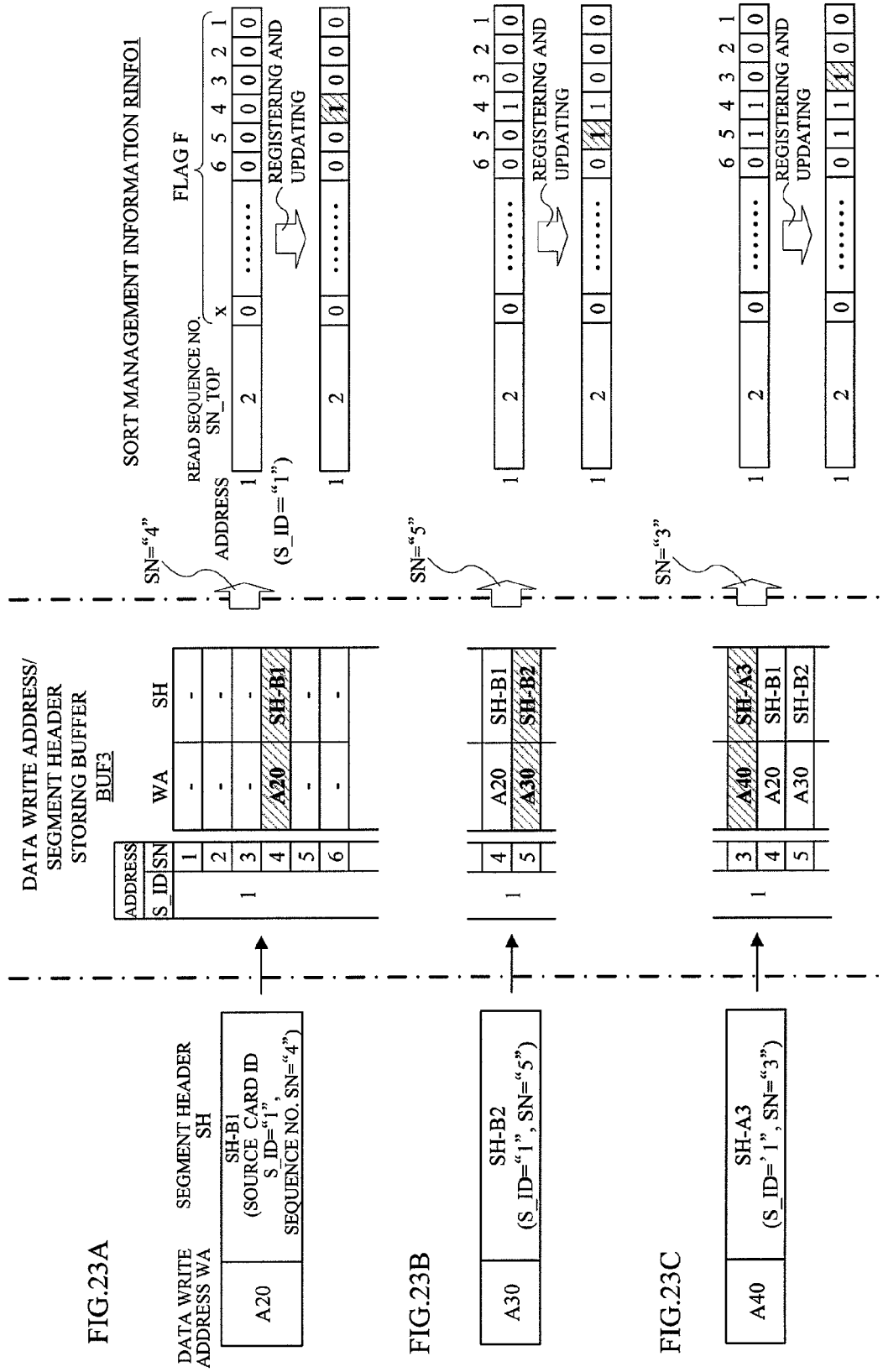
FIGS. 23A-23C are diagrams showing an operation example (No. 2) of a sorting portion used for an embodiment [2] of a packet relay method and device according to the present invention.

In operation, the sorting portion 316 sorts the data write address WA and the segment header SH having received from the data buffer controller 312 and the reception processor 311 as follows:

Namely, as shown in FIG. 22, the write controller 3161 firstly receives the segment header SH-A1 and the data write address WA="A10". Since the source card ID S_ID set in the segment header SH-A1 is "1" and the sequence No. SN is "1" at this time, the write controller 3161 writes the data write address WA="A10" and the segment header SH-A1 in the address "11" of the data write address/segment header storing buffer BUF3 with "source card ID S_ID "1"+sequence No. SN "1"" being as the write address Anx_W.

The write controller 3161 reads the sort management information RINFO1 from the address "1" by providing the read control signal RS1 (source card ID S_ID="1") to the sort management information RINFO, and provides the sequence No. SN="1" to the sort management information registering/updating portion 3162.

The sort management information registering/updating portion 3162 sets (registering and updating) the flag corresponding to the sequence No. SN="1" within the sort management information RINFO1 to "1", and writes the sort management information RINFO1_AU after the registering and updating over the address "1" of the sort management information RINFO.

When the sort management information circulating reader 3163 provides the read control signal RS2 (source card ID S_ID="1") to the sort management information RINFO, so that the sort management information RINFO1_AU after the registering and updating is read from the address "1", the read controller 3164 recognizes that the flag F corresponding to the read sequence No. SN_TOP="1" for the source card ID S_ID="1" is set to "1", reads the data write address WA="A10" and the segment header SH-A1 from the address "11" of the data write address/segment header storing buffer BUF3 with "source card ID S_ID "1"+read sequence No. SN_TOP "1"" being as the read address Anx_R, providing the data write address and the segment header to the link list controller 313 as the data write address WA_R and the segment header SH_R after sort.

Concurrently, the read controller 3164 sets the flag corresponding to the read sequence No. SN_TOP="1" within the sort management information RINFO1_AU to "0", updates (deleting and updating) the read sequence No. SN_TOP to the next sequence No. "2", and writes the sort management information RINFO1_EU after the deleting and updating over the address "1" of the sort management information RINFO.

As shown in FIG. 23A, when receiving the segment header SH-B1 and the data write address WA="A20", the write controller 3161 writes the data write address WA="A20" and the segment header SH-B1 in the address "14" of the data write address/segment header storing buffer BUF3 since the source card ID S_ID and the sequence No. SN set in the segment header SH-B1 are "1" and "4", respectively.

The write controller 3161 reads the sort management information RINFO1 from the address "1" by providing the read control signal RS1 (source card ID S_ID="1") to the sort management information RINFO, and provides the sequence No. SN="4" to the sort management information registering/updating portion 3162.

The sort management information registering/updating portion 3162 sets the flag corresponding to the sequence No. SN="4" within the sort management information RINFO1 to "1".

When the sort management information circulating reader 3163 reads the sort management information RINFO1, the read controller 3164 recognizes that the flag F corresponding to the read sequence No. SN_TOP="2" for the source card ID S_ID="1" is set to "0" (the segment data where the sequence No. SN="2" is set is not received), so that no processing is executed.

In the same way as the above, as shown in FIGS. 23B and 23C, when the segment header SH-B2 and the data write address WA="A30" as well as the segment header SH-A3 and the data write address WA="A40" are received, the data write address WA="A30" and segment header SH-B2 as well as the data write address WA="A40" and the segment header SH- A3 are respectively written in the addresses "15" and "13" of the data write address/segment header storing buffer BUF3. Also, the flags corresponding to the sequence Nos. SN="5" and "3" within the sort management information RINFO1 are respectively set to "1".

Figure 24:
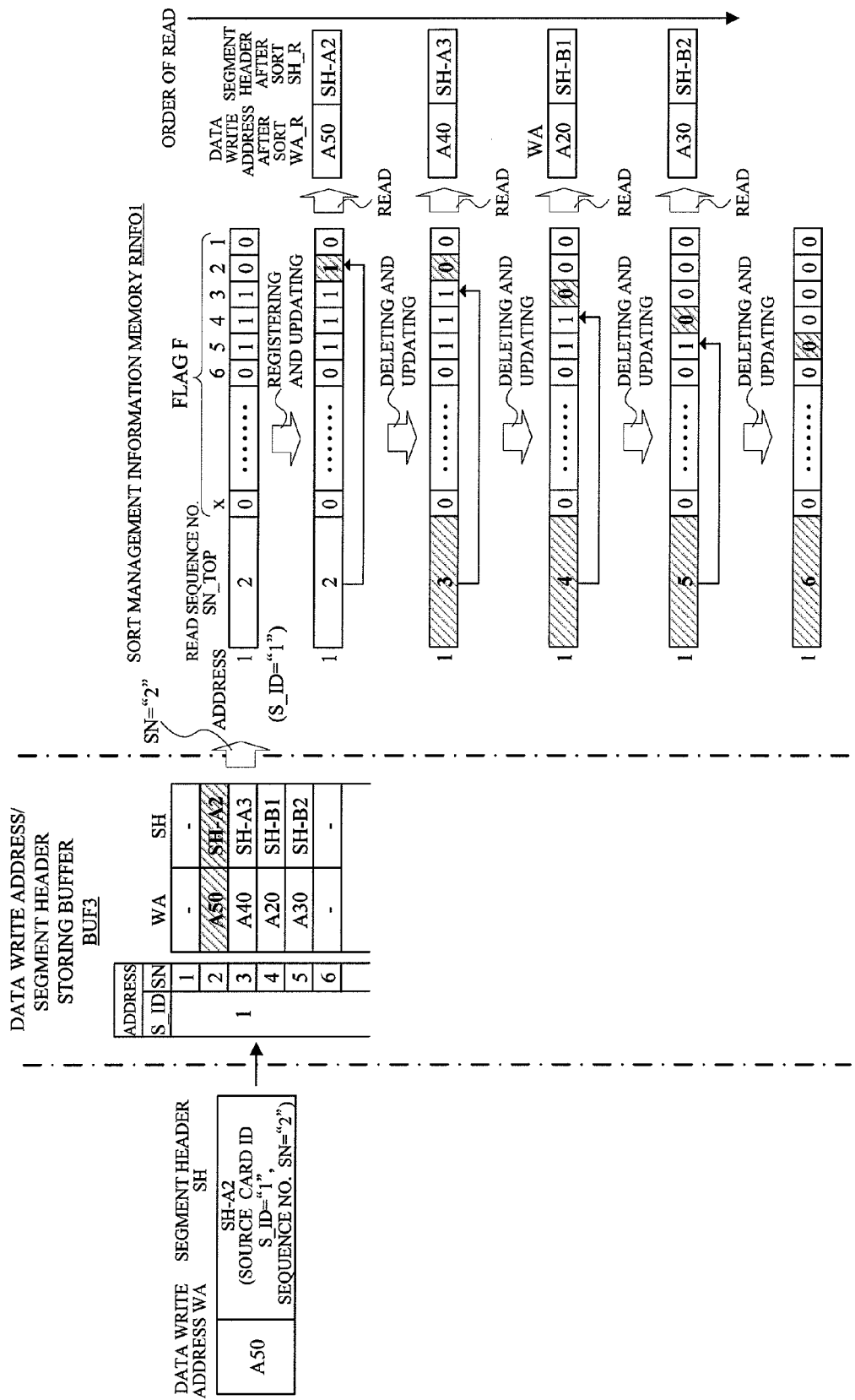
FIG. 24 is a diagram showing an operation example (No. 3) of a sorting portion used for an embodiment [2] of a packet relay method and device according to the present invention.

As shown in FIG. 24, when receiving the segment header SH-A2 and the data write address WA="A50", the write controller 3161 writes the data write address WA="A50" and the segment header SH-A2 in the address "12" of the data write address/segment header storing buffer BUF3 since the source card ID S_ID and the sequence No. SN set in the segment header SH-A2 are "1" and "2", respectively.

The write controller 3161 reads the sort management information RINFO1 from the address "1" by providing the read control signal RS1 (source card ID S_ID="1") to the sort management information RINFO, and concurrently provides the sequence No. SN="2" to the sort management information registering/updating portion 3162.

The sort management information registering/updating portion 3162 sets the flag corresponding to the sequence No. SN="2" within the sort management information RINFO1 to "1".

When the sort management information circulating reader 3163 reads the sort management information RINFO1, the read controller 3164 recognizes that the flag F corresponding to the read sequence No. SN_TOP="2" for the source card ID S_ID="1" is set to "1", reads the data write address WA="A50" and the segment header SH-A2 from the address "12" of the data write address/segment header storing buffer BUF3, and provides the data write address WA and the segment header SH-A2 to the link list controller 313 as the data write address WA_R and the segment header SH_R after sort. Concurrently, the read controller 3164 sets the flag corresponding to the read sequence No. SN_TOP="2" within the sort management information RINFO1 to "0", and updates the read sequence No. SN_TOP to "3".

At this time, the read controller 3164 further recognizes that the flag corresponding to the read sequence No. SN_TOP="3" is set to "1", reads the data write address WA="A40" and the segment header SH-A3 from the address "13" of the data write address/segment header storing buffer BUF3, sets the flag corresponding to the read sequence No. SN_TOP="3" within the sort management information RINFO1 to "0", and updates the read sequence No. SN_TOP to "4".

Thereafter, by repeating these operations, the data write address WA="A20" and the segment header SH-B1 as well as the data write address WA="A30" and segment header SH-B2 are respectively provided to the link list controller 313 as the data write address WA_R and the segment header SH_R after sort, the read sequence No. SN_TOP within the sort management information RINFO1 is updated to "6", and the flags corresponding to the sequence Nos.="4" and "5" are set to "0".

Thus, the segment header and the data write address can be sorted in order of the sequence No. of the segment data assigned by the segment data divider 12_1, namely in order of the transmission of the segment data, and then provided to the link list controller 313.

It is to be noted that the present invention is not limited by the above-mentioned embodiments, and it is obvious that various modifications may be made by one skilled in the art based on the recitation of the claims.

What is claimed is:

1. A packet relay method of a packet relay device having a plurality of input potions, switching portions and output portions comprising:

a first step of separating segment data into a segment header and one data, every time the segment data where the segment header in which a source address indicating an identifier of one of the input portions and location information indicating a location within a packet for the one data together with a sequence number of the segment data are set is added to the one data within the packet divided per predetermined length is received from the switching portions in parallel;

a second step of sequentially storing the one data separated;

a third step of generating or updating a link list associating the segment header separated with a storage of the one data separated per source address based on the location information set in the segment header separated;

a fourth step of sequentially reading the one data from the storage obtained by sequentially referring to the link list;

a fifth step of collecting the one data read to assemble the packet based on the location information set in the segment header obtained by sequentially referring to the link list;

a sixth step of sequentially associating and storing the segment header separated at the first step with the storage of the one data separated; and a seventh step of sequentially referring to the segment header stored at the sixth step, reading the segment header referred to and the storage of the one data separated corresponding to the segment header and executing the third step when the source address and the sequence number set in the segment header referred to coincide with any source address and a read sequence number of the segment data to be read for the source address, and updating the read sequence number to a sequence number to be read next;

wherein the sixth step comprises setting, when associating the segment header separated with the storage of the one data separated to be stored, a flag to "received" corresponding to the sequence number set in the segment header stored in management information in which the read sequence number for each source address is associated with the flag indicating whether or not the segment header having set therein each sequence number is stored; and the seventh step comprises circulating the management information per source address to be referred, determining the coincidence when the flag corresponding to the read sequence number is set to "received", and releasing setting of the flag being referred.

2. The packet relay method as claimed in claim 1, further comprising an eighth step of scheduling the link list generated or updated at the third step;

the fourth and fifth steps comprising performing the sequential referring from the link list to which the scheduling is performed.

3. The packet relay method as claimed in claim 1, wherein the sixth step comprises performing the storing with the source address and the sequence number set in the segment header separated being as a key; and the seventh step comprises performing the reading with the source address and the read sequence number being as a key.

4. A packet relay device comprising:
a plurality of input potions;
a plurality of switching portions; and
a plurality of output portions, each of the output portions comprising:
- a first portion separating segment data into a segment header and one data, every time the segment data where the segment header in which a source address and location information indicating a location within a packet for the one data together with a sequence number of the segment data are set is added to the one data within the packet divided per predetermined length is received from the switching portions in parallel;
- a second portion sequentially storing the one data separated;
- a third portion generating or updating a link list associating the segment header separated with a storage of the one data separated per source address based on the location information set in the segment header separated;
- a fourth portion sequentially reading the one data from the storage obtained by sequentially referring to the link list;
- a fifth portion collecting the one data read to assemble the packet based on the location information set in the segment header obtained by sequentially referring to the link list; and
- a sixth portion sequentially associating and storing the segment header separated by the first portion with the storage of the one data separated; and
- a seventh portion sequentially referring to the segment header stored by the sixth portion, reading the segment header referred to and the storage of the one data separated corresponding to the segment header and executing the third portion when the source address and the sequence number set in the segment header referred to coincide with any source address and a read sequence number of the segment data to be read for the source address, and updating the read sequence number to a sequence number to be read next;
- wherein the sixth portion comprises a portion which sets, when associating the segment header separated with the storage of the one data separated to be stored, a flag to "received" corresponding to the sequence number set in the segment header stored in management information in which the read sequence number for each source address is associated with the flag indicating whether or not the segment header having set therein each sequence number is stored; and
- the seventh portion comprises a portion which circulates the management information per source address to be referred, determining the coincidence when the flag corresponding to the read sequence number is set to "received", and releasing setting of the flag being referred.

5. The packet relay device as claimed in claim 4, wherein each of the output portions further comprises an eighth portion scheduling the link list generated or updated by the third portion and the fourth and fifth portions perform the sequential referring from the link list to which the scheduling is performed.

6. The packet relay device as claimed in claim 4, wherein the sixth portion comprises a portion performing the storing with the source address and the sequence number set in the segment header separated being as a key; and
- the seventh portion comprises a portion performing the reading with the source address and the read sequence number being as a key.

* * * * *